United States Patent
Liao et al.

(10) Patent No.: US 11,341,331 B2
(45) Date of Patent: May 24, 2022

(54) SPEAKING TECHNIQUE IMPROVEMENT ASSISTANT

(71) Applicant: Microsoft Technology Licensing, LLC, Redmond, WA (US)

(72) Inventors: Huakai Liao, Vancouver (CA); Priyanka Vikram Sinha, Sunnyvale, CA (US); Kevin Dara Khieu, East Palo Alto, CA (US); Derek Martin Johnson, Sunnyvale, CA (US); Siliang Kang, Redmond, WA (US); Huey-Ru Tsai, Los Altos, CA (US); Amit Srivastava, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/593,724

(22) Filed: Oct. 4, 2019

(65) Prior Publication Data

US 2021/0103635 A1    Apr. 8, 2021

(51) Int. Cl.
*G06F 40/289*    (2020.01)
*G10L 15/18*    (2013.01)
(Continued)

(52) U.S. Cl.
CPC .......... *G06F 40/289* (2020.01); *G06F 40/106* (2020.01); *G06F 40/211* (2020.01);
(Continued)

(58) Field of Classification Search
CPC ..... H04L 65/604; H04L 65/403; G01L 13/00; G01L 15/1822; G01L 15/22;
(Continued)

(56) References Cited

U.S. PATENT DOCUMENTS 10,069,971 B1    9/2018  Shaw et al.
10,560,492 B1 *  2/2020  Ledet ...................... G06F 3/038
(Continued)

OTHER PUBLICATIONS

Audhkhasi, et al., "Formant-Based Technique for Automatic Filled-Pause Detection in Spontaneous Spoken English", In Proceedings of IEEE International Conference on Acoustics, Speech and Signal Processing, Apr. 19, 2009, 4 Pages.

*Primary Examiner* — Kevin Ky

(74) *Attorney, Agent, or Firm* — Calfee, Halter & Griswold LLP

(57) ABSTRACT

An intelligent speech assistant receives information collected while a user is speaking. The information can comprise speech data, vision data, or both, where the speech data is from the user speaking and the vision data is of the user while speaking. The assistant evaluates the speech data against a script which can contain information that the user should speak, information that the user should not speak, or both. The assistant collects instances where the user utters phrases that match the script or instances where the user utters phrases that do not match the script, depending on whether phases should or should not be spoken. The assistant evaluates vision data to identify gestures, facial expressions, and/or emotions of the user. Instances where the gestures, facial expressions, and/or emotions are not appropriate to the context are flagged. Real-time prompts and/or a summary is presented to the user as feedback.

20 Claims, 10 Drawing Sheets

(51) Int. Cl.
*G06N 3/08* (2006.01)
*G06K 9/00* (2022.01)
*G10L 15/22* (2006.01)
*G06F 40/106* (2020.01)
*G06F 40/211* (2020.01)
*G06V 40/10* (2022.01)
*G06V 40/16* (2022.01)

(52) U.S. Cl.
CPC ............. *G06N 3/08* (2013.01); *G06V 40/107* (2022.01); *G06V 40/176* (2022.01); *G10L 15/1822* (2013.01); *G10L 15/22* (2013.01)

(58) Field of Classification Search
CPC .. G06F 17/2775; G06F 17/271; G06F 17/212; G06N 3/08; G06K 9/00375; G06K 9/00315
See application file for complete search history.

(56) References Cited

U.S. PATENT DOCUMENTS

| | | | | |
|---|---|---|---|---|
| 2013/0231930 | A1* | 9/2013 | Sanso | G10L 15/26 704/235 |
| 2016/0077719 | A1* | 3/2016 | Threewits | G06F 3/04845 715/714 |
| 2018/0315420 | A1* | 11/2018 | Ash | G10L 15/187 |
| 2019/0361842 | A1* | 11/2019 | Wood | H04L 9/3247 |
| 2020/0135050 | A1* | 4/2020 | Monge Nunez | G06N 20/00 |
| 2020/0296457 | A1* | 9/2020 | Church | H04N 21/6587 |
| 2021/0065582 | A1* | 3/2021 | Liao | G10L 15/02 |

* cited by examiner

SPEAKING TECHNIQUE IMPROVEMENT ASSISTANT

FIELD

This application relates generally to an assistant to help users improve their speaking techniques. More specifically, this application relates to an intelligent assistant that can utilize sensors and natural user input to help users improve their speaking techniques.

BACKGROUND

Many users struggle with public speaking, particularly when it involves giving a presentation or a speech. In fact, fear of public speaking is one of the most common fears that people have. From a technical standpoint, systems have been unable to help users overcome fear of public speaking or have been unable to help users improve their public speaking.

It is within this context that the present embodiments arise.

DETAILED DESCRIPTION

Figure 1:
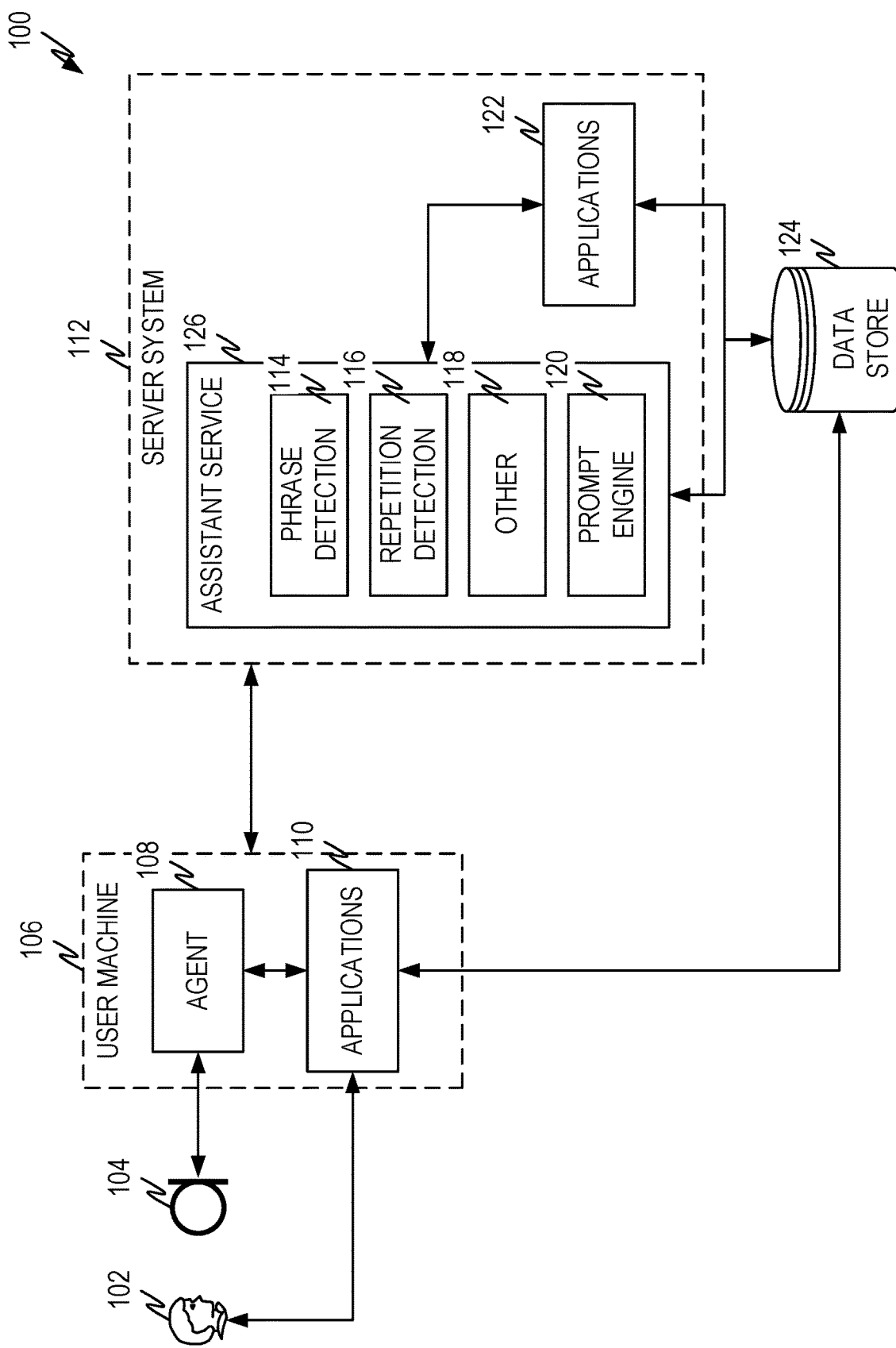
FIG. 1 illustrates an example architecture diagram according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Fear of public speaking is often ranked as one of people's worst fears. Yet, giving presentations and occasional speeches is part of many careers and activities, and as such a common occurrence for many people. When a person is nervous or uncomfortable, their normal manner of speaking may be altered without them even realizing it. For example, they may use phrases that are offensive to listeners, they may disclose proprietary information that should not be disclosed, stray from a script, simply repeat what is displayed on a slide, use facial expressions, gestures, and/or display emotions that are inappropriate to the situation.

A common solution for improving the quality of a presentation or speech is to practice beforehand. Tis may be done in front of a mirror, for example, to observe body language, or if possible, in front of another person who can point out shortcomings that the presenter may be unaware of. Practicing in front of a mirror, however, does not always result in the speaker being able to identify issues in their speech. For example, when you are focused on examining your body language, you may not notice the particular phrases spoken, or conversely when attention is given to the phrases spoken, body language may become inappropriate to the context.

Technically, it is difficult for a machine to interpret aspects of "good speaking" or "good presentation skills." Even if some systems can detect certain aspects of "good speaking" or "good presentation skills," the manner in which these systems interact with users is often less than helpful.

To address these technical problems and more, embodiments disclosed herein help coach users during presentations, public speaking, and other interactions. The embodiments disclose an intelligent agent that can monitor users through one or more sensors and provide actionable feedback while the user is speaking and/or a summary document describing improvements that the user can make. Embodiments of the present disclosure can detect, among other things, when a user is simply repeating what is displayed on a screen during a presentation or speech, when a user is using phrases that should either be avoided or that should be included, use of gestures and body language, and other aspects that a user can utilize to improve their speaking and/or avoid common errors during speaking.

In some embodiments, an agent monitors a user through the use of one or more sensors as the user is speaking, presenting, and/or so forth either in a practice scenario or a live scenario. The sensors can capture data such as the user's voice, gestures, facial expressions, and so forth. Once the data is captured, the data can be converted to a format suitable for evaluation. For example, voice can be converted to text through a speech to text process. Images and/or video can be converted by focusing on aspects that should be evaluated such as hand gestures, facial expression, and so forth. The focusing can involve eliminating extraneous background in some embodiments.

Once the data is converted to a format suitable for evaluation, one or more features can be extracted, if desired. For example, voice can be broken up into sections or phrases to be analyzed. Video can be segmented into clips or a sequence of images can be extracted.

The features are presented to one or more detection engines that have been programmed or trained (as the case may be) to identify particular events of interest. For example, phrases that should be avoided or included can be detected, the user's words can be compared to text displayed to an audience or to a script, too much or too little use of hands can be detected, and/or so forth.

When an event of interest is detected, the event and/or a metric related to the event is evaluated to identify whether the event rises to the level of something that should be considered for a summary, for a real-time prompt, or both. Items that rise to the level of something that should be captured for a summary are stored so that they can be used to create a summary at a later time. Items that rise to the level of a prompt, trigger a process by which a prompt is identified and displayed to a user.

Through the use of summaries and/or prompts, the user can identify improvements that can be made.

Description

As a general matter, the methods and systems described herein may include, or otherwise make use of, a machine-trained model to identify contents related to a text. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity such as gestures, determine associations between facial expressions and emotions, identify whether prompts are likely to be a distraction to a user, and/or other applications as discussed herein. Such determination may be made following the accumulation, review, and/or analysis of user data from users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a machine learning method may be used for initial training and/or subsequent training of a machine learning model using training data obtained from a training data repository, from device-generated data, from direct and/or indirect feedback from users, and so forth as described herein. The training may include and/or have access to substantial computation resources for training, such as a cloud, including many computer server systems adapted for machine learning training. In some implementations, the ML model training automatically generates multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example architecture 100 according to some aspects of the present disclosure. A user 102 can interact with one or more applications 110 on a user machine 106 and/or one or more applications 122 that run on a server system 112 and that are available to the user. The applications 110, 122 can be applications that a user would use to create and/or rehearse a speech, presentation, or other interaction as a slide presentation (e.g., Microsoft® PowerPoint, Apple® Keynote. Google® Slides, and so forth), a text editor (e.g., Microsoft® Word, Apple® Pages, Google® Docs, and so forth), teleprompters, or other such applications. The applications 110, 122, can be used to create content to be presented, and, in conjunction with an agent 108, rehearse the user's speech, presentation, or other interaction. To simplify the discussion herein, the term "script" will be used to refer to one or more documents that contain content to be presented or that should not be presented. Thus, a script can be a slide deck, a text document, a collection of phrases that should or should not be spoken, and/or so forth. The term "presentation" will be used to refer to the actual event of a user speaking to present the content in the script.

In some presentation instances, some or all of the content of the script will be displayed to an audience when the user is speaking such as when a user uses a slide deck to accompany a presentation. In other instances, the user who is speaking has some or all of the content of the script displayed to them, while the audience has either no or different information. An example would be where the user has information displayed on a screen, teleprompter, and so forth that is not visible to the audience.

The user machine 106 and/or server system 112 may be connected to or include one or more data stores 124, which can be the same or different data stores. The data stores 124 may function as a repository in which datasets relating to training models, data relating to the speech rehearsal assistance service and/or data relating to applications 110, 122 may be stored. Although shown as a single data store, the data store 124 may be representative of multiple storage devices and data stores which may be connected to each of the speech assistant service 126, applications 110, 122 or detection/analysis engines 114, 116, 118, 120. Moreover, the sever system 112 may include a plurality of servers that work together to deliver the functions and services provided by each service or application. The server system 112 may operate as a shared resource server located at an enterprise accessible by various computer client devices such as user machine 106. The server may also operate as a cloud-based server for offering speech rehearsal assistance services in one or more applications such as applications 110, 122.

The user machine 106 comprises an agent 108 which uses one or more sensors 104 to observe the user 102 during a presentation. Examples of suitable client devices 130 include but are not limited to personal computers, desktop computers, laptop computers, mobile telephones, smart phones, tablets, phablets, smart watches, wearable devices, gaming devices/computers, televisions, teleprompters, and the like. Sensors 104 can comprise any sensors that allow capturing information from and about the user 102. For example, in one embodiment sensors 104 comprise on or more microphones that can capture speech data from the user 102 as the user presents a presentation. In another embodiment sensors 104 comprise one or more cameras or other sensors (collectively, vision sensors) that capture vision data that can be analyzed for facial expressions, gestures, body language, and so forth. In other embodiments, both microphones and vision sensors are used. The agent and/or sensors can operate for rehearsal of a presentation, or for a "live" (non-rehearsal) version of the presentation. The agent captures data such as voice and/or vision data and provides the data to the assistant service for analysis and feedback to the user.

Although the agent 108 is shown as being separate from applications 110, the functionality described above can be provided by applications 110 and/or applications 122, in which case an agent 108 may not be utilized.

In some embodiments, in addition to capturing information for analysis by the assistant service 126, the agent can interact with one or more applications 110 and/or 122 as described more fully below to receive input from a user and provide information and feedback to the user through the applications 110, 122. In other embodiments, such functions can be provided directly by assistant service 126.

Assistant service 126 receives sensor data, places the data in a format suitable for analysis, initiates analysis of the data, captures summary information, and/or provides real-time prompts to the user as described herein. The analysis of the data can be performed by one or more detection/analysis engines. Embodiments of the present disclosure can comprise one or more of the detection/analysis engines in any combination. Details of representative detection/analysis engines are discussed in greater detail below. Some examples of detection/analysis engines that can be included in embodiments of the disclosure include, but are not limited to, phrase detection, repetition detection, body language detection, gesture detection, emotion detection, and so forth. These are illustrated by phrase detection/analysis engine 114, repetition detection/analysis engine 116, and other detection/analysis engines 118.

The detection/analysis engines perform analysis and/or detection of specific aspects of a presentation or a user's delivery of the presentation. For example, phrase detection/analysis engine 114 can detect certain phrases uttered by a user during the presentation. These can be phrases that should be uttered, should not be uttered, or a combination thereof. In a representative example, use of non-inclusive phrases can offend individuals listening to a presentation. However, often these phrases are simply part of a user's vernacular. The phrase detection/analysis engine 114 can detect these types of phrases, inform the user that such a phrase has been used, suggest alternatives to the phrase, and so forth. As another example, suppose a product presentation has the possibility of disclosing trade secrets that a company would rather keep secret. Phrase detection can detect phrases that disclose trade secrets and warn a user that such phrases should not be spoken during a presentation. The details of specific detection/analysis engines are discussed below.

Models used by the detection/analysis engines of the assistant service 126 can comprise machine learning models, rules engines, heuristics, and so forth to accomplish the detection/analysis as described herein. Machine learning models be trained by a training mechanism such as mechanism known in the art. The training mechanism may use training datasets stored in the datastore 124 or at other locations to provide initial and ongoing training for each of the machine learning models. In one implementation, the training mechanism may use labeled training data to train models via deep neural networks. The initial training may be performed in an offline manner such that initial training of the model is accomplished prior to use of the model in its corresponding detection/analysis engine.

The assistant service 126 also comprises a prompt engine 120. When an detection/analysis engine determines that an event that the detection/analysis engine watches for has occurred, the prompt engine makes a determination as to whether a real-time prompt related to the event should be displayed to the user. The prompt engine 120 is responsible for determining whether to display a real-time prompt, what the content of the prompt should be, and the timing to display the prompt to the user. Operation of a representative prompt engine 120 is discussed below.

Events detected by the detection/analysis engines are also stored (e.g., in data store 124) and compiled into a summary that is displayed to the user at the end of the presentation. The summary can contain detail not contained in any real-time prompts that are displayed to a user. The summary is discussed in greater detail below.

Figure 2:
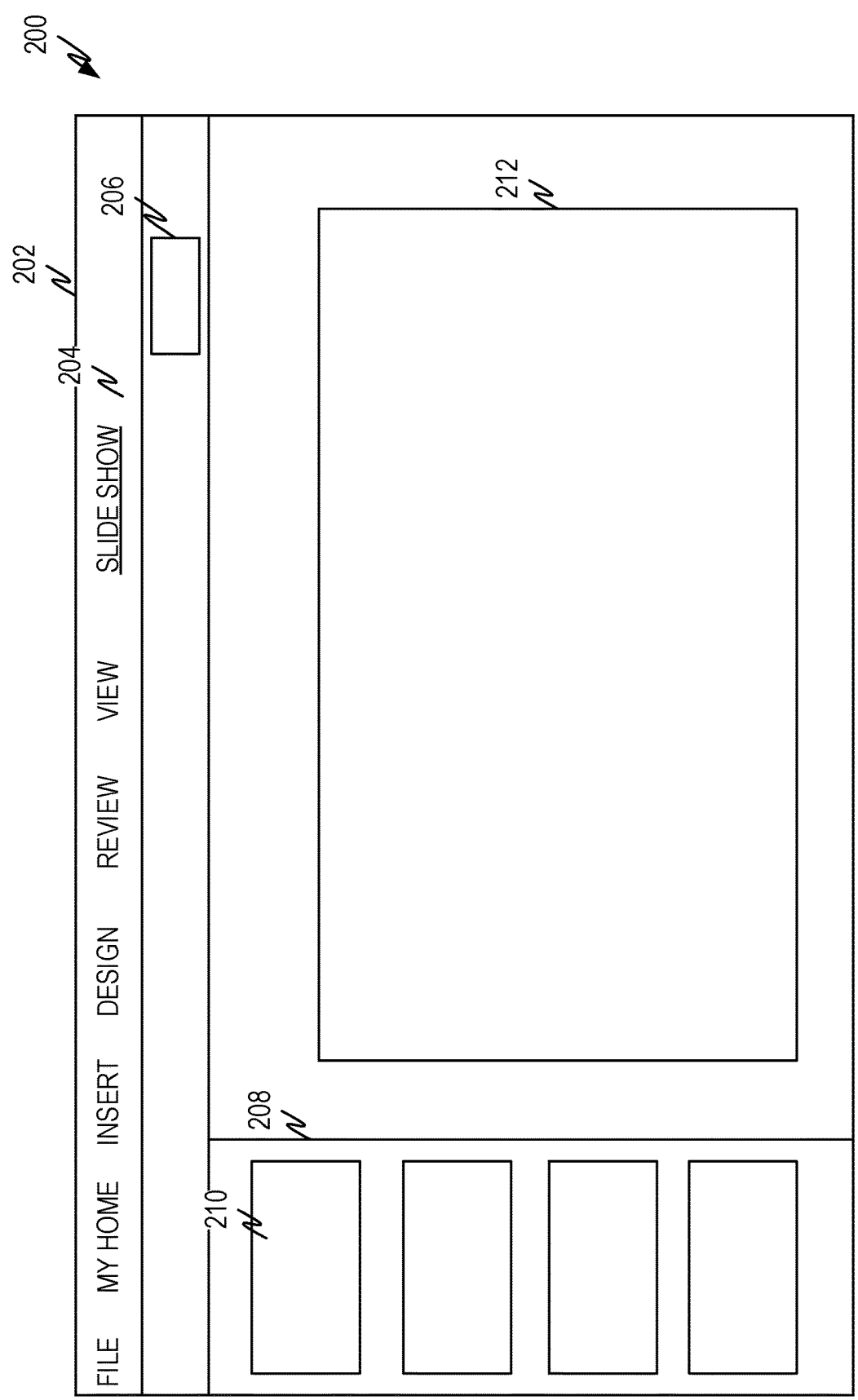
FIG. 2 illustrates an example user interface screen according to some aspects of the present disclosure.
Figure 3:
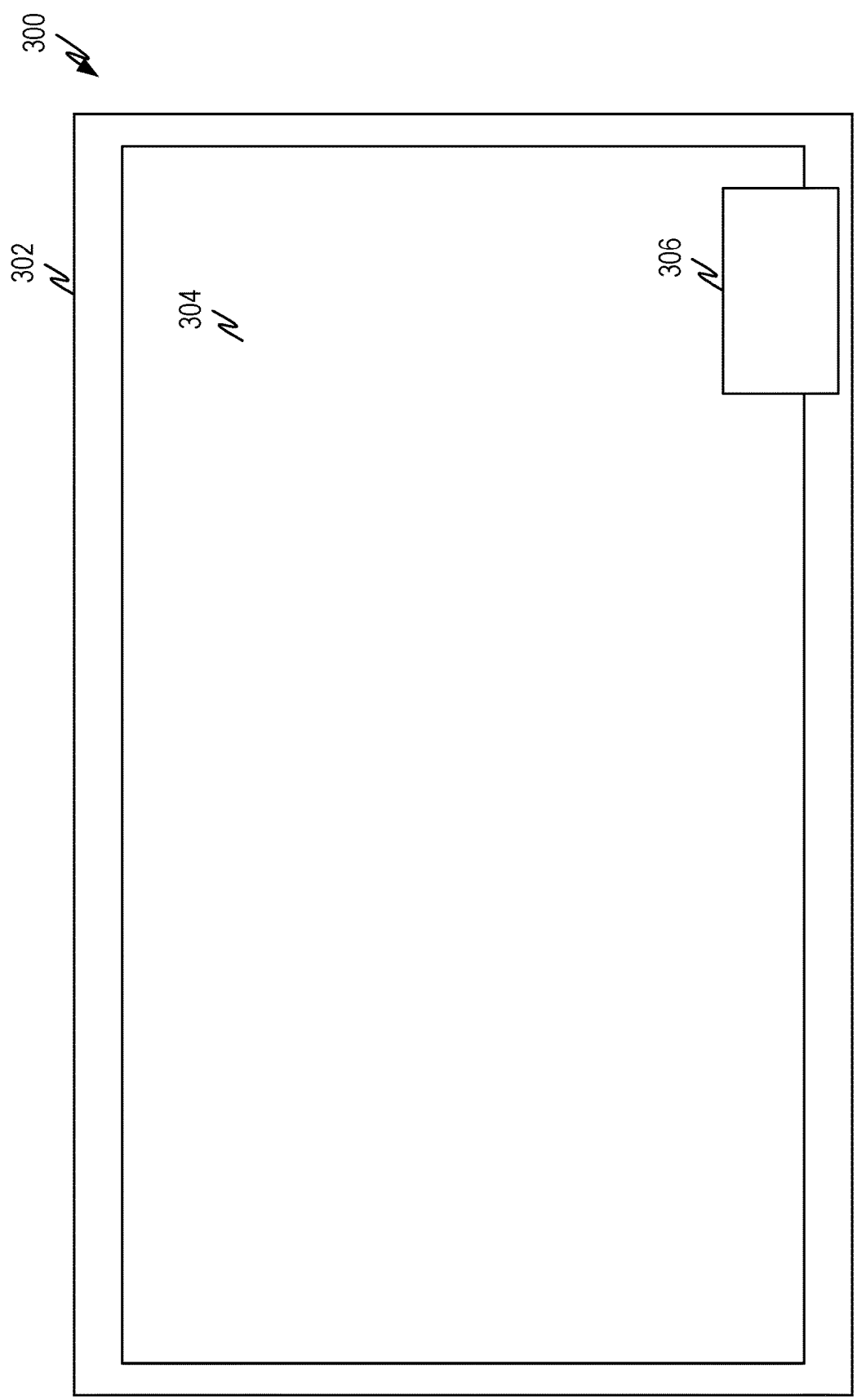
FIG. 3 illustrates an example user interface screen according to some aspects of the present disclosure.
Figure 4:
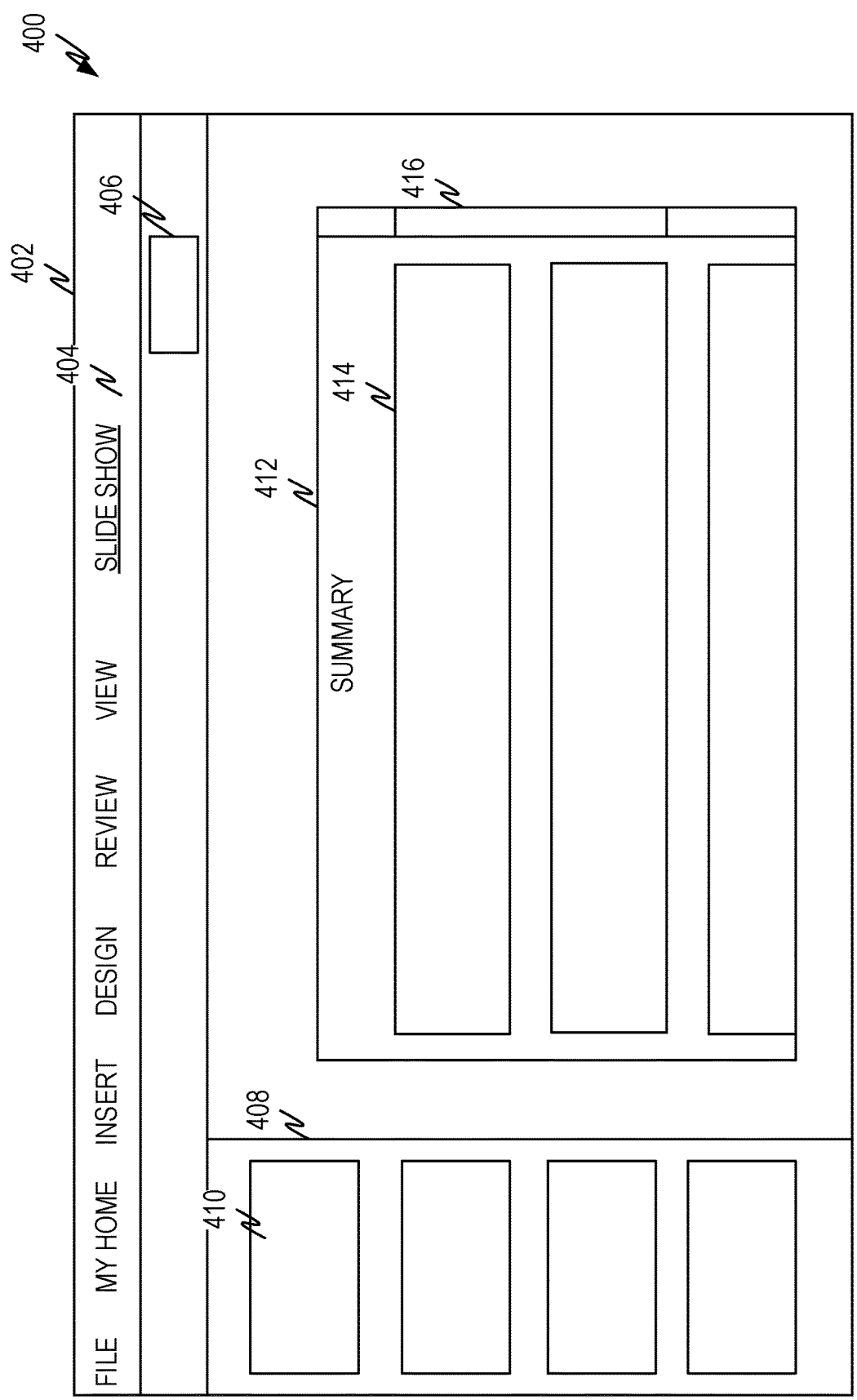
FIG. 4 illustrates an example user interface screen according to some aspects of the present disclosure.

A representative example of how the architecture of FIG. 1 operates to assist users during a presentation is presented in FIGS. 2-4. These figures present a representative example of how a user would interact with the system, invoke the assistant service 126, and the resultant user experience.

FIG. 2 illustrates an example user interface (UI) screen according to some aspects of the present disclosure shown generally as 200. The UI 202 can represent the UI of one or more applications, such as applications 110 and/or applications 122 of FIG. 1. The UI 202 may have an area 204 where various menu and/or ribbon options are presented. Such an area can comprise a plurality of tabs for providing various menu options. For example, a File tab can allow access to file related menu options such as saving a file, opening a file, exporting a file in a different format, and so forth. A user can activate corresponding functionality by selecting a tab and/ or UI controls that are revealed when a tab is selected.

If the application is a slide show or slide deck creation/ presentation application, the UI can comprise one area 208 where one or more slides 210 are presented to allow a user to select an active slide 212 which is presented in an enlarged view so the user can view the slide, edit the slide, change the slide format, and so forth.

In a representative embodiment, one UI control 206 can invoke functionality to engage sensors such as those described above to capture information about the user and/or a presentation of the user. This can occur, as previously explained, in conjunction with a user rehearsing a presentation or with a live, non-rehearsal presentation. Additionally, or alternatively, engagement of the functionality can occur when the user enters a "presentation mode" where slides are projected as part of a presentation.

Activation of the UI control 206 and/or presentation mode in the application allows the sensors (e.g., 104) to capture data such as voice and/or vision data so that the assistant service 126 can evaluate the presentation and provide feedback to the user. This is sometimes referred to herein as engaging or activating assistant functionality.

Once the assistant functionality is activated, the user gives the presentation. The sensors capture voice and/or vision data and the assistant begins evaluation of the captured data as described herein.

FIG. 3 illustrates an example user interface screen according to some aspects of the present disclosure, shown generally as 300. The UI screen 302 can represent an example of what the user sees once the assistant functionality is activated and the user begins the presentation. One area 304 of the UI screen 302 may be used to display the information that is displayed to the audience. Additionally, or alternatively, the UI screen can display other information such as speakers notes, a timer to show how long the user has been speaking, how long the user has been speaking since the last slide change, and/or so forth. These aspects are not illustrated in FIG. 3.

As described herein, when the detection/analysis engines of the assistant service detect an event, a prompt engine determines whether to display a prompt to the user, what the content of the prompt is, and the timing on the display of the prompt. As a representative example, suppose an embodiment of an assistant service comprises a repetition detection engine, which detects whether a user is simply repeating what is written on a slide presented to the audience. In such a situation, the prompt engine may determine to display a prompt that states "Focus on Key Points and Avoid Repeating the Slide." Such a prompt can be displayed in the UI screen in real-time in a display area such as 306. Such a prompt would not be visible to the audience.

Although FIG. 3 focuses on visual display of a prompt, audio, and other mechanisms can be used in conjunction with or as an alternative to, visual display of a prompt. For example, if a user has access to an audio channel that cannot be heard by the audience, the assistant service 126 can play a sound to alert the user to the prompt. Additionally, or alternatively, an audio prompt containing the same or different information can be played over the audio channel.

As another example, haptic feedback can be used either in conjunction with, or as an alternative to, visual display of a prompt. For example, the assistant service may cause a user's watch to vibrate in a particular pattern to either alert the user to the prompt or to provide particular feedback to the user. Different patterns can be used for general alerts and alerts tied to a particular event, such as when the user is repeating the content of the slide.

As yet another example, although the prompt area 306 is shown as being displayed on the same device as other content available to the user, prompts can be sent to different devices. For example, a prompt or other indication can be displayed on a teleprompter. Thus, prompts can be sent to one or more devices and can comprise one or more different types of prompts and can comprise the same or different content, in any combination.

Once the user has finished the presentation, a summary of events can be displayed to the user. FIG. 4 illustrates an example user interface screen according to some aspects of the present disclosure, shown generally as 400, that can display a summary to the user. In this example, the UI screen reverts back to the UI screen the user saw prior to beginning the presentation, with one or more areas for menu and/or ribbon controls, UI controls, and so forth 404, 406, an area to display slides 410 in the deck 408, and another area where a summary 412 can be displayed.

The summary 412 comprises one or more areas 414 where information regarding events that were detected by the assistant service can be displayed. Additionally, other UI elements and/or controls can be displayed if desired or needed such as a scroll bar 416.

The summary can provide information that expands on events that resulted in a prompt to a user as well as information on events that did not result in a prompt to the user. The example creation of a summary, representative information that can be contained in a summary, and so forth are discussed below in conjunction with FIG. 9.

Figure 5:
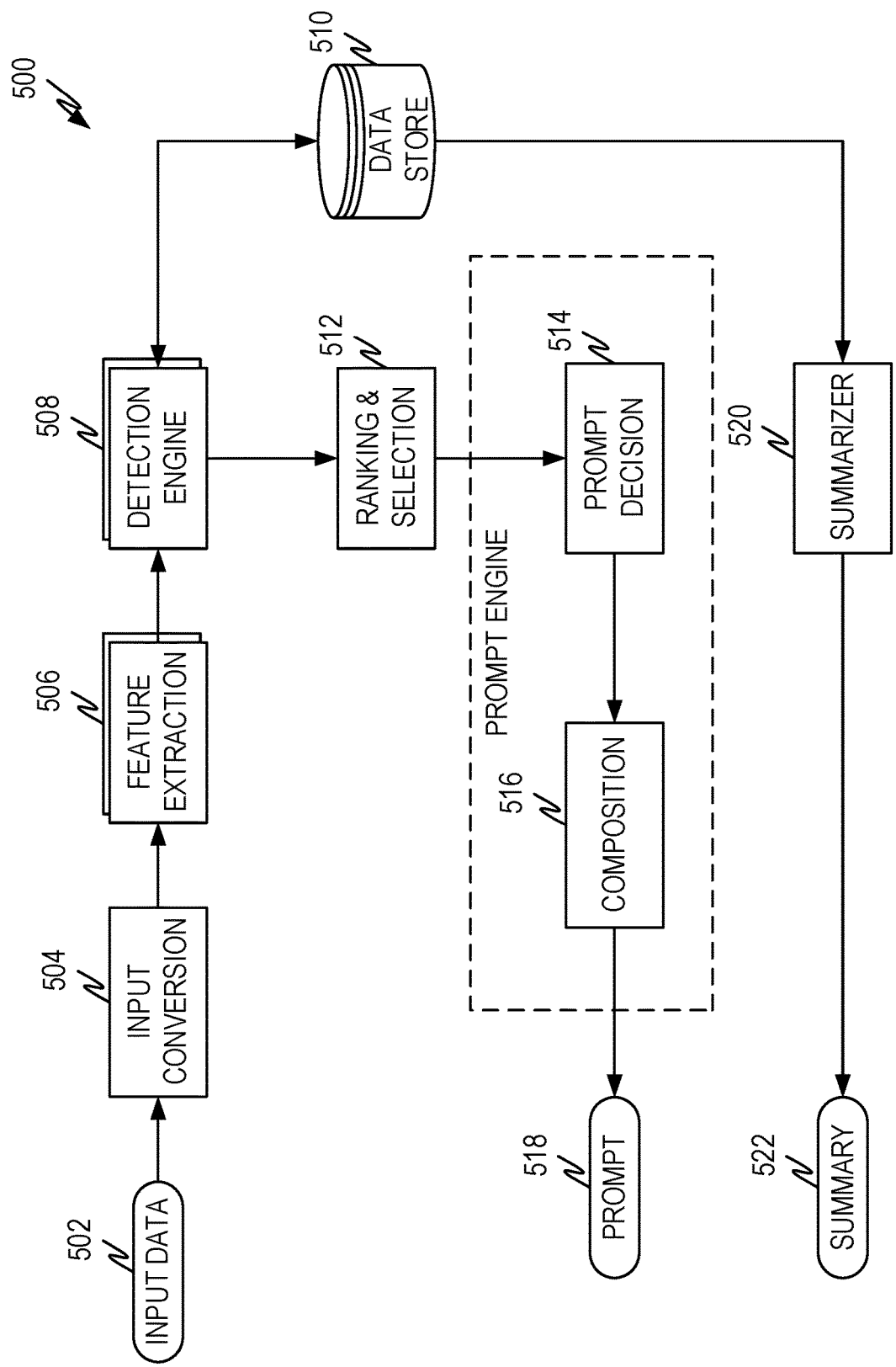
FIG. 5 illustrates an example architecture according to some aspects of the present disclosure.

FIG. 5 illustrates an example architecture 500 according to some aspects of the present disclosure. The architecture 500 is a representative example of an architecture for an assistant service, such as assistant service 126 of FIG. 1.

Sensor data 502 represents data captured by one or more sensors such as previously described. As an example, input data can comprise audio data of a user giving a presentation, vision data (e.g., video and/or other data captured by vision sensors) of a user giving a presentation, and/or so forth. In another example, the sensors can include biometric sensors from the user during the presentation that can capture information such as heart rate, respiration rate, temperature, whether the user is sweating, and/or so forth. The sensor data 502 is data associated with a user while the user is making the presentation.

Sensor data 502 is typically unsuitable for analysis in its raw form. Thus, the sensor data 502 can be converted to a suitable format for analysis. This is performed by input conversion 504. For example, audio data can be converted to text using a speech to text conversion process. As another example, video data can be converted to a sequence of "still" photos that can be analyzed. Additionally, or alternatively, input conversion 504 can perform additional processing on one or more data streams before or after format conversion. Such additional processing can include one or more of: reducing the number of data points from one or more of the plurality of data sources (removing extraneous data, removing data that is obviously wrong, reducing the overall number of data points, etc.); aggregating data points from the plurality of data sources (combining multiple sets of data into a single set of data, etc.); time aligning data points from the plurality of data sources (matching data point time scales, time shifting, etc.); normalizing the data from one or more of the plurality of data sources; changing format of the data from one or more of the plurality of data sources; and/or other data processing techniques that allow data from multiple different data sources to be combined.

In some embodiments input conversion is performed in real-time. In this context real-time means in sufficient time so that the remainder of the processing (e.g., the rest of the functions in the architecture) can be complete and a decision made to present a prompt to the user while the prompt is still relevant to what the user is saying in the presentation. For example, it does nothing to prompt a user to refrain from reading the content on a slide if, by the time the prompt is displayed, the user has moved on and is now presenting a different slide. Real-time conversion may include processing the sensor data 502 in chunks or may include processing the sensor data as a continuous stream.

Feature extraction process 506 extracts features from the data if used and/or creates feature vectors if used that allow the detection/analysis engines 508 to perform their work. For example, if machine learning models are used by one or more of the detection/analysis engines 508, the input feature vectors for the machine learning models can be created. Feature extraction is particular to the specific implementation of a detection/analysis engine. Therefore, it is not possible to give a general description of the process used by feature extraction process 506 for each and every possible detection/processing engine. However, once the implementation of a detection/processing engine has been established, those of skill in the art will understand how to create an appropriate set of input data, including any feature vectors. It is sufficient for those of skill in the art to specify that feature extraction process 506 creates the input for the specific detection/processing engines 508 in the assistant service.

The assistant service comprises one or more detection/analysis engines 508 that detect specific events that occur during the presentation. Examples of detection/analysis engines that can be included in embodiments of the present disclosure include, but are not limited to, a phrase detector, a repetition detector, an emotion detector, a facial expression detector, a gesture (or other body language) detector, and so forth.

A phrase detector is designed to detect one or more phrases spoken by a user during a presentation. The detected phrases can include phrases that should be spoken, phrases that should not be spoken, and/or any combination thereof. This helps users to utilize phrases that may be most effective and to refrain from using phrases that have the potential of offending an audience, have the potential to cause harm to a company, user, group, and/or so forth.

In one embodiment the phrase detector detects the use of non-inclusive language. Non-inclusive language can include words, phrases, tones and so forth that reflect prejudiced, stereotyped, or discriminatory views of particular people or groups. It can also include language that deliberately excludes people from being seen as part of a larger group. Non-inclusive phrases can include phrases that may be sensitive in different political, cultural, or other contexts, so that sometimes whether a phrase is non-inclusive can depend on context. Collected examples of non-inclusive language exist and can be utilized either as training data for training an appropriate machine language model that detects non-inclusive language, or that can be used for comparison to a textual transcript of the presentation to determine congruence between the user's speech and non-inclusive phrases.

In another embodiment the phrase detector detects the use of language that would disclose company trade secrets or other language that may subject a company or other relevant entity to potential harm or liability. Often it can be a difficult line for users announcing new products, company direction, and so forth to ensure that company confidential information that should remain secret not be discussed. The phrase detector can be employed to alert a user that use of particular language is not appropriate.

In yet another embodiment, the user may want to ensure they use particular language to make a point or convey a particular aspect of the script. These phrases can be detected by the phrase detector and the assistant can alert the user when the phrases are not used in the presentation. Thus, embodiments of a phrase detector can ensure that particular phrases are used as well as ensuring that particular phrases are not used. Of course, combinations of phrases that should be used and phrases that should not be used can be identified by the phrase detector.

A repetition detector detects when a user is repeating content that is part of the script. This can be a positive or negative thing and the assistant distinguishes between the two situations, as illustrated by the two examples below.

In a first example, the script comprises a set of slides that are presented to the audience during the presentation. It is universally acknowledged that simply repeating information contained on a slide is not an effective presentation technique. Thus, the repetition detector can identify when a user is repeating the information on the slide and remind the user to make changes that can include, but are not limited to, any combination of: using different language than what is contained in the script (e.g., slides); make the main points and refrain from repeating the script; and so forth.

In a second example, the script contains the text of a speech that the user should stick to. In this situation, following the script is a positive thing. The repetition detector can detect when the user is following the script and when the user strays from the script. When the latter happens, the assistant can prompt the user that they are off script and/or make suggestions on how to return to the script.

The assistant can also comprise detection/analysis engines that process vision data, speech data, biometric data, and/or any combination thereof to identify emotions that hinder effectiveness of a presentation (e.g., nervousness, nervous habits, fear, boredom, and/or so forth), to identify actions by a user that hinder the effectiveness of a presentation (inappropriate gestures, too many/too few gestures, pacing, lack of eye contact with the audience, and so forth). These can come in the form of individual detectors that are specific to a particular situation such as an emotion detector, a facial expression detector, a gesture (or other body language) detector, and so forth, or can come in the form of one or more detectors that can detect multiple situations.

Such visual detectors are known in the art. For example, machine learning has been used to build models that can detect user emotion from facial expressions, biometric data, text (e.g., speech and/or language), or some combination thereof. Some of these machine learning models have been made public, some can be accessed via application programming interfaces (APIs) of various types, or combinations thereof. For example, as of this writing Microsoft® Cognitive Services can be accessed at azure.microsoft.com/en-us/services/cognitive-services/ and provides solutions accessible through APIs that analyze input data and can provide various emotional state detection. Additionally, or alternatively, other algorithms which utilize machine learning to analyze text, biometric data, facial expressions and so forth to identify emotional state are known and can be utilized in embodiments of the present disclosure.

The visual detectors utilized in embodiments of the present disclosure look for emotions that hinder effectiveness of the presentation in order to provide feedback of the emotions. Additionally, or alternatively, the visual detectors utilized in embodiments of the present disclosure look for emotions that are effective for the presentation in order to provide feedback of those emotions.

As a representative example, emotions that may hinder effectiveness of a presentation include, but are not limited to, fear, boredom, stress, and/or nervousness. When these emotions are detected a visual detection/analysis engine can capture an event that indicates presentation effectiveness may be hindered by expression of the emotions.

As another representative example, emotions that may make the presentation more effective include, but are not limited to, excitement, and/or engagement. When these emotions are detected a visual detection/analyses engine can capture an event that indicates presentation effectiveness may have been enhanced.

In addition to emotions, visual detector/analysis engines can be trained to detect gestures and/or body language and/or lack thereof. As a representative example, as of this writing, Microsoft® Azure Kinect DK (azure.microsoft.com/en-us/services/kinect-dk/) provides advanced AI sensors for building computer vision applications. The Microsoft® Azure Kinect provides body and hand tracking along with vision data which can be used to detect and track gestures, hand and/or body positioning of the user during the presentation. The vision and/or tracking and body positioning data from the Microsoft® Azure Kinect can be utilized to train a machine learning model to provide gesture detection and identification. For example, a machine learning classifier that utilize vision data can be used to accept annotated vision and/or the output body tracking information from the Microsoft® Azure Kinect to train a classifier that detects particular types of gestures and thus detects their occurrence. From the detection and identification of gestures, the gesture types and/or gesture rate can be calculated and compared to standards to ascertain things like whether a user is gesturing too much, too little, using inappropriate or ineffective gestures, and other gesture data and statistics.

The output of the various detection/analysis engines 508 can be captured in a data store 510 when an event is detected. For example, when an event is detected one or more of the following can be captured and stored in the data store 510:

Event type;
Time stamp associated with the event (e.g., when did the event occur within the presentation);
Script information being displayed and/or presented at the time of the event such as an identifier associated with a displayed slide, the displayed slide, portion of the script corresponding to content being spoken by the user at the time of the event, and/or so forth;
Sensor data at the time of the event and/or surrounding the time of the event;
Transcript (e.g., converted sensor data) at the time of the event and/or surrounding the time of the event;
A confidence level calculated by the detection/analyses engine and associated with the event;
One or more metrics or additional data associated with the event such as number of words matched a phrase, alternative phrases that should have been used in place of the phrase used, and/or other data; and/or
Other data.

The stored data is used to create a summary as discussed herein.

When multiple events occur and are pending possible notification to the user through one or more prompts, the architecture can employ ranking and selection processes 512 to rank the events and select an appropriate number for presentation. Any type of ranking criteria can be used. For example, in one embodiment, events can be ranked by type, such that one type of event (say inappropriate phrase detected) is ranked higher than another (say too frequent gesturing). In another example, events can be ranked by time such that the most recent or the least recent is ranked highest and ranks decrease thereafter by time. In another example, events can be ranked by confidence level or another metric associated with the events. In still another example, events can be ranked by an associated device and/or prompt channel. In some embodiments, particular events and/or event types can be associated with a particular device and/or prompt channel. Ranking can be done by these criteria in these embodiments. Finally, multiple tiers of ranking can be applied where events are ranked by one or more criteria and then ranked by one or more other criteria.

Selection of the events to be further considered can be done according to any particular criteria such as the highest ranked event, the highest N ranked events, and so forth.

Figure 8:
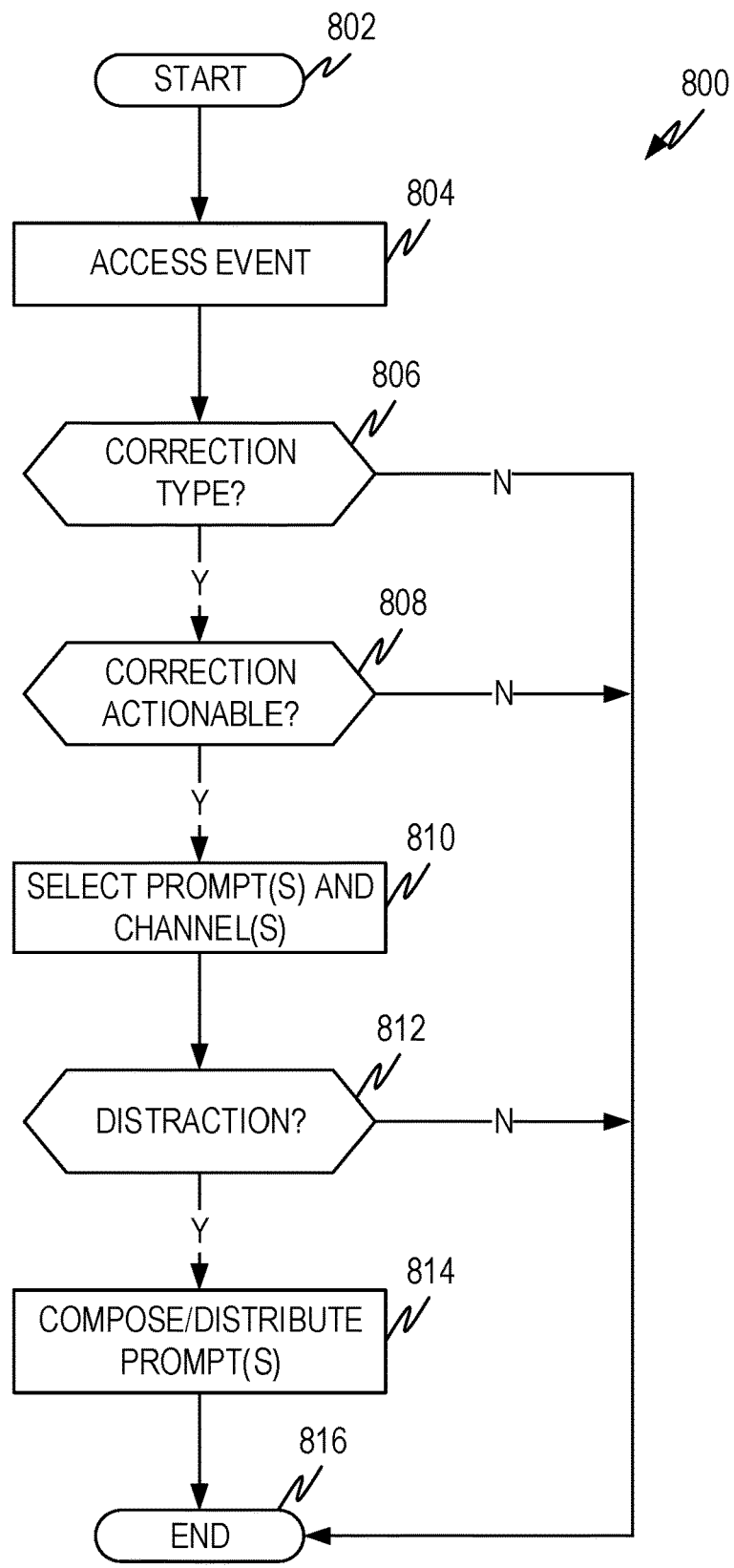
FIG. 8 illustrates an example flow diagram illustrating prompt decision and composition according to some aspects of the present disclosure.

The selected event(s) are presented to the prompt engine for consideration as to whether a prompt should be presented to the user. FIG. 8 below discusses a representative prompt engine implementation in greater detail. In essence, however, the prompt engine decides whether one or more prompts should be presented (e.g., prompt decision 514) and if so, composes the prompt(s), selects a device and/or mechanism to present the prompt(s) (prompt channel) and causes the prompt(s) 518 to be presented by sending them through the appropriate prompt channel(s).

After the presentation, the summarizer 520 creates a summary 522 as described herein and causes the summary 522 to be displayed to the user.

Figure 6:
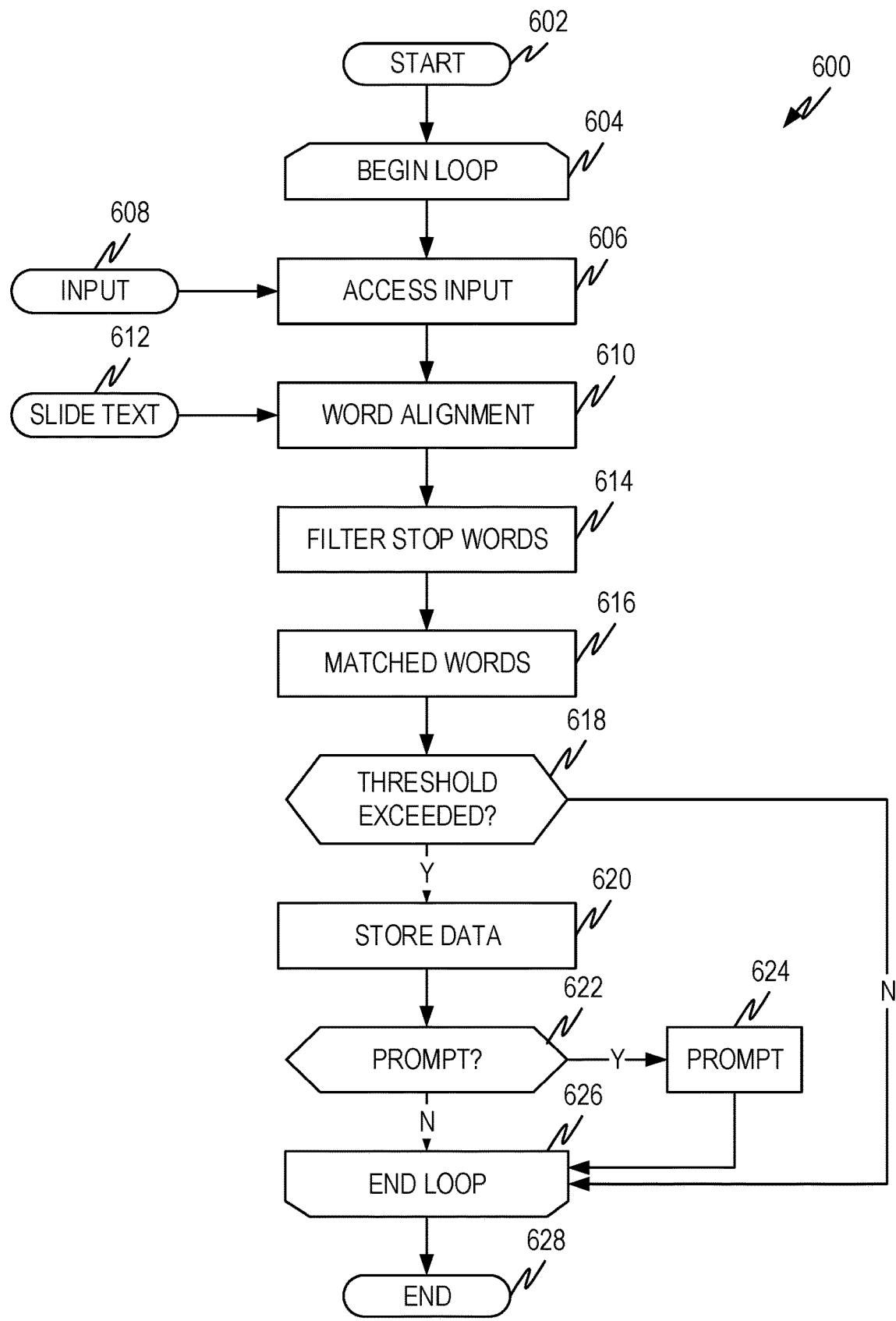
FIG. 6 illustrates an example flow diagram illustrating detecting repetition of a document according to some aspects of the present disclosure.

FIG. 6 illustrates an example flow diagram 600 illustrating detecting repetition of a document according to some aspects of the present disclosure. As discussed above, detecting repetition of a script is one of the detection/analysis engines that can be included in embodiments of the present disclosure, either alone or along with other detection/analysis engines discussed herein in any combination. Detecting repetition of a script is done by detecting congruence between the script and the user's speech.

The method begins at operation 602 and proceeds to operation 604 which begins a loop over a group of spoken language and/or block of text that should be considered. The loop can be bounded by time, by a block of text from the script, by a set of spoken text, another bounding criterion, and/or any combination thereof. The time, block of text, and/or set of spoken text can be any subset of the presentation, including the entire presentation if desired. In many instances, natural breaks occur in the presentation that create natural bounds for the loop. For example, when slides accompany the presentation, the loop can be bounded by the time the user spends discussing the slide, such as the time spent on a slide before the slide is changed. In another example, where a speech is given, and the text of the speech has sections or breaks, such breaks/sections can be used to bound the loop.

The input data (e.g., transcribed audio text) and/or script text that is considered in each iteration of the loop can vary according to the embodiment, the presentation, the script, and so forth. For example, transcribed audio text can be separated into spoken sentences and/or spoken phrases by using the natural speaking breaks a user uses while speaking or based on some other criteria, such as natural language processing, semantic analysis, and/or so forth. Thus, in this discussion, a spoken phrase refers to a segment of spoken audio that has been converted to text, such as through a speech to text process. The loop 604 is thus over all spoken phrases that occur during the bounds of the loop, such as the spoken phrases that occur during the time that a given slide is displayed.

Operation 606 accesses the next spoken phrase 608 to be considered. This is obtained such as by separating the textual transcript into spoken phrases in a manner noted above and then collecting all the spoken phrases during the bounds of the loop into a set. Operation 606 then accesses the next spoken phrase in the set. Note that this can happen in real-time as the user is speaking where the spoken phrases are transcribed as the user is speaking. In such a situation, each iteration of the loop may occur as the user speaks each phrase. Additionally, or alternatively, the collection of spoken phrases into a set can be from a transcription of a subset of the presentation, including the entire presentation.

Operation 606, or another operation, can perform some types of text conversion before matching begins. Often when a transcript of spoken language is made, certain spoken things are spelled out in the transcript, where they would be written otherwise in the script. For example, consider numbers. When numbers appear in a script, the person putting the script together will often adhere to set of rules that specify when a number should be spelled out (e.g., ten) and when a number should use the corresponding symbol (e.g., 10). These rules can be applied to the transcript so that numbers are identified as matching. Similar rules apply to symbols (e.g., %), dates, and other items. Any or all of such rules can be applied to the spoken phrases to ensure that matches occur when they should.

Additionally, or alternatively, the script text can be converted to how the transcript is created. For example, all numbers and symbols can be replaced by their spelled out versions if the transcript is created so that everything is spelled out.

The portion of the script being considered 612 is accessed and operation 610 performs word alignment with the spoken phrase. This involves identifying which portion of the script most closely matches the spoken phrase. This can be accomplished, for example, by a string search for the spoken phrase in the script text being considered. Additionally, or alternatively, a metric such as the Levenshtein edit distance between the script text (or a portion thereof) and the spoken phrase can be used to align the spoken phrase and the script text. Additionally, or alternatively, prior spoken phrases that have already been considered may help give additional alignment clues as to how the spoken phrase relates to the script text. This can be helpful, for example, in disambiguating how the spoken phrase aligns with the script text.

Operation 614 can filter stop words and/or use other filter criteria to remove words, phrases, and/or other items that should be removed before the matching metric is calculated. For example, titles can be removed since it may be just fine for a speaker to repeat the title of a slide, a graph presented in a slide, and/or so forth. Quotes identified in a text script can be removed from consideration since it is common and/or desirable to repeat quotes word for word. As another example, text boxes in the script with few words can be removed from consideration. As yet another example, common phrases that should not count as being repeated in the script text can be removed. The filtering criteria of operation 614 can contain any combination of filter criteria or only a single filter criterion.

If the script text against which the spoken phrase is eliminated due to filtering, then the current iteration of the loop can be terminated (e.g., at operation 626) and the next iteration of the loop, if any, begun.

Additionally, or alternatively, before or after filtering a test can be performed to determine a length metric before the match metric is calculated. For example, the length metric can be the number of words remaining (e.g., in the spoken phrase, in the script text, or both) to be matched. If the length metric is below a threshold, the match process is exited. In a representative example, the length metric is calculated from the script text. If the script text is fewer than seven words, than a match will not be attempted and the current iteration of the loop can be terminated (e.g., at operation 626) and the next iteration of the loop, if any, begun.

In some embodiments, filtering and/or matching can be performed by a trained ML model may be used that examines the script text and identifies which phrases should be kept and which should be eliminated for matching purposes. To achieve this, context, meaning, grammar and the like may be taken into account. The trained ML model may be a natural language processing (NPL) model such as NPLs known in the art.

Another approach for filtering and/or matching may involve the use of a deep neural network. For example, a masked convolutional or a recurrent convolutional neural network may be developed that examines the spoken phrases and script text to ascertain a match metric such as the likelihood (e.g., probability) of a match between the two. As another example, a masked convolutional or recurrent convolutional neural network can be trained to evaluate the spoken phrases and/or script text and filter out those words that have little impact on determining a probability of a match. The match metric can then be calculated in another way such as using the Levenshtein edit distance.

Operation 616 calculates the match metric, also referred to as a congruence metric, using a trained ML model, or a different method such as counting the words that match between the spoken phrase and corresponding script text, calculating the Levenshtein edit distance between the spoken phrase and corresponding script text, and/or so forth.

Operation 618 determines congruence between the spoken phrase and text based on a congruence criterion (or criteria). For example, in one embodiment, congruence is determined by comparing the match metric to a threshold to determine if a repetition event occurred. Typically, comparison operations can be set up to be "true" if a threshold is exceeded or if a value drops below a threshold, just by setting up the comparison differently. This is well known by those of skill in the art. For example, if the probability of match is the metric, and if a match is determined to occur when the probability exceeds a given threshold, an equivalent comparison can be set up by comparing value of 1.0−(the probability of a match) to an equivalent threshold and declaring a match when the value is below the equivalent threshold. In this disclosure, exceeding the threshold or determining congruence will be used to cover both of these situations for simplicity in description.

Operation 618, then, determines congruence between the phrase and user's speech by comparing the match metric to a threshold and determines a repetition event occurs when the threshold is exceeded (e.g., congruence criterion is met). For example, if the number of matching words is the match metric, the threshold can be seven words. In another example, the metric can be the percentage of words that match between the spoken phrase and the text script. Thus, the metric is calculated by dividing the number of words that match by the length of the spoken phrase or the length of the portion of the text script that is being compared to the spoken phrase. The threshold can be set between 0.8 and 0.9 inclusive, so that a repetition event is determined when more than 80% to 90%, depending on where the threshold is set.

If a repetition event is not determined, the "N" branch out of operation 618 is taken and the next iteration of the loop, if any, is begun.

If a repetition event is determined, the "Y" branch out of operation 618 is taken and operation 620 stores the event and associated data in a data store as described herein so that a summary can be made using the stored data after the presentation.

Operation 622 determines if a prompt should be displayed to the user. FIG. 8 discusses this process in greater detail. In general, however, a prompt is displayed based on one or more of: the amount of information that would be displayed; whether the prompt creates something that is actionable for the user; and/or the type of correction being made.

If the determination for operation 622 is to display a prompt, the "Y" branch is taken, and one or more prompts are created and sent via appropriate channels in operation 624. If the determination is to not display a prompt, the "N"

branch is taken and the end loop operation 626 determines whether to initiate the next iteration of the loop.

The method ends at operation 628.

The flow diagram in FIG. 6 is set up to declare a repetition event when spoken phrases match text script and to possibly prompt the user that they are simply reading the text script. Stated another way, a repetition event is determined when congruence between text and speech exists (e.g., a positive congruence criterion is met). This is used in situations where simply reading the script is seen as a bad thing, such as a user reading the content of a slide during a presentation. However, as discussed herein, there are situations where it is good for the user to follow and/or repeat the script. For example, where a user is giving a speech or a performance where the user should follow the script. In these situations, rather than determine a repetition event and record summary information and possibly prompt the user when they are following/repeating the script, the system should record summary information and possibly prompt the user when they are off script. Stated another way, a repetition event is determined when congruence between text and speech does not exist (e.g., a negative congruence criterion is met).

The "off script" situation can be accommodated by switching the "Y" and "N" branches of operation 618. Thus, the system would record summary information if it was found that the user was not following the script (e.g., matching metric not above a threshold). Similarly, a prompt would be considered for the off script situation. Obviously, the type, content, and/or channels for the prompt(s) associated with an off script situation would be different.

Finally, it may be desirable to detect both an "on script" and "off script" situation in different parts of a presentation. In other words, some parts should be on script and some should be off script. This may be accommodated, for example, by annotating the script text as to whether a user should or should not be repeating it and dynamically changing operation 618 as appropriate to detect the on script or off script situation.

When both "on script" and "off script" testing is to be performed, the testing can be performed by a single detection/analysis engine that tests both conditions or can be performed by multiple detection/analysis engines, with one focused on the "on script" events and the other focused on the "off script" events.

Additionally, or alternatively, when multiple events are determined (multiple "on script" events, multiple "off script" events, or a combination of both), the system can utilize ranking and selection processes such as those described above in conjunction with 512 to prioritize and/or select which events are considered for prompting, event storage, and/or other processing.

Figure 7:
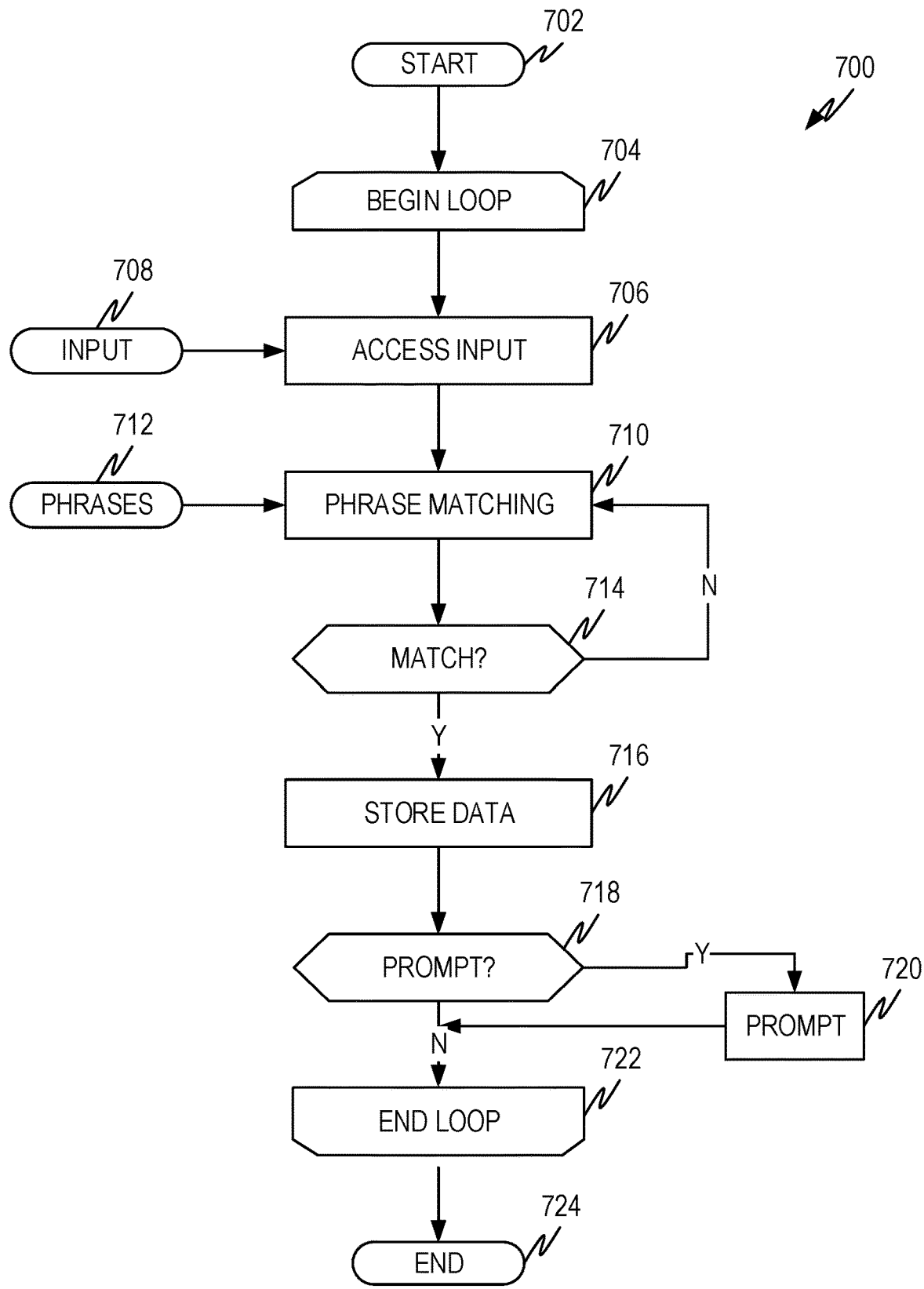
FIG. 7 illustrates an example flow diagram illustrating phrase detection according to some aspects of the present disclosure.

FIG. 7 illustrates an example flow diagram 700 illustrating phrase detection according to some aspects of the present disclosure. As discussed above, detecting phrases is one of the detection/analysis engines that can be included in embodiments of the present disclosure, either alone or along with other detection/analysis engines discussed herein in any combination.

The method begins at operation 702 and proceeds to operation 704 which begins a loop over a group of spoken language that should be considered. Although the loop can be bounded by one or more criteria (e.g., such as time, script text, and/or spoken text as described in conjunction with FIG. 6), in general the loop runs over all phrases spoken by the user during the duration of the presentation. Thus, in general the loop beginning at operation 704 is repeated for each spoken phrase of the user.

User speech is broken into spoken phrases using one or more of natural language processing, semantic analysis, user speech patterns, and/or so forth as previously described. Operation 706 accesses the next spoken phrase 708 for consideration.

Operations 710 and 714 loop over all control phrases to consider 712 and identify those control phrases 712 that match (e.g., have congruence with) the spoken phrase.

Phrase matching is the process of determining whether or not the user's speech has congruence with one or more phrases that should and/or should not be spoken. Phrase matching (e.g., operation 710) can be performed in a variety of ways, depending on the embodiment. The mechanism(s) for determining phrase matching in any given embodiment can, in some instances, be based on the format of the control phrases. For example, control phrases may be expressed as a list of phrases. In another example, a control phrase may be expressed by one or more keywords or other metric that represent the corresponding control phrase. In still another example, a control phrase can be expressed by one or more rules that represent the control phrase. Phrase matching can be performed in different ways in some embodiments, depending on the representation of the control phrases to be considered.

As a representative example, control phrases can comprise non-inclusive phrases. Non-inclusive phrases can be embodied in a set of phrases that should not be used such as "you guys," or "call a spade a spade." Additionally, or alternatively, non-inclusive phrases can be embodied on rules that, when broken, often result in non-inclusive language. For example, rules like "put people first" in any language construction (thus, "a woman on our engineering team" rather than "female engineer") or "avoiding idioms, jargons, and acronyms" (thus, "tell it like it is" rather than "call a spade a spade"). Phrase matching can comprise matching phrases using one or more methods when control phrases are represented by phrases. Phrase matching can comprise evaluating whether spoken phrases adhere to or break rules when control phrases are represented by rules.

Determining whether phrases match can comprise using one or more trained ML models, using other known matching algorithms, and/or using any combination thereof. In some embodiments, matching can be performed by a trained ML model may be used that examines a spoken phrase and compares it to a control phrase to determine whether a match exists and/or determine the likelihood (e.g., probability) of a match. To achieve this, context, meaning, grammar and the like may be taken into account. The trained ML model may be a natural language processing (NPL) model such as NPLs known in the art.

Another approach for matching may involve the use of a deep neural network. For example, a masked convolutional or a recurrent convolutional neural network may be developed that examines a spoken phrase and a control phrase to ascertain a match metric such as the likelihood (e.g., probability) of a match between the two. As another example, a masked convolutional or recurrent convolutional neural network can be trained to evaluate the spoken phrases and/or control phrases and filter out those words that have little impact on determining a probability of a match. As another example, the match metric can then be calculated in another way such as using the Levenshtein edit distance.

Operation 710 calculates the match metric and/or otherwise determines whether a match exists between the spoken phrase and control phrase using one or more trained ML models, and/or a different method such as counting the words that match between the spoken phrase and control phrase, calculating the Levenshtein edit distance between the spoken phrase and control phrase, and/or so forth.

Operation 714 determines what happens when congruence between the control phrase and the spoken phrase. When a match does not exist (negative congruence criterion), the next control phrase is considered until a match is found as represented by the "N" branch out of operation 714.

When a match is found (positive congruence criterion), the "Y" branch out of operation 714 is taken and the event (e.g., phrase match) is stored along with other data used to create a summary in operation 716. The data that is stored can comprise any of the data as described herein.

Although the operations in the diagram show only a single match is needed before checking stops (in point of fact, the way the flow diagram is written, the first match will cause checking against control phrases 712 to terminate), embodiments of the present disclosure may check all or part of the set of control phrases 712 before deciding whether a match occurred, and if so, store data regarding the match (operation 716). In some embodiments, when multiple matches are identified, the method can further comprise ranking and selection logic to determine which matches should be stored and whether to take one or more of the matching events forward in the method and determine whether a prompt should be displayed, and so forth as described below.

When multiple matches exist, ranking and selection processes, such as those described above in conjunction with 512 can be used to prioritize and/or select which matches will be considered for event data storage, a real-time prompt, and/or other processing.

Once the data regarding the match(es) have been stored for the summarization process in operation 716, execution proceeds to operation 718 where the method determines whether to display a prompt to the user. FIG. 8 discusses this process in greater detail. In general, however, a prompt is displayed based on one or more of the amount of information that would be displayed; whether the prompt creates something that is actionable for the user; and/or the type of correction being made.

If the determination for operation 718 is to display a prompt, the "Y" branch is taken, and one or more prompts are created and sent via appropriate channels in operation 720. If the determination is to not display a prompt, the "N" branch is taken and the end loop operation 722 determines whether to initiate the next iteration of the loop.

The method ends at operation 724.

In the method above, control phrases can comprise different types (also referred to as categories) of control phrases. For example, as already discussed control phrases can be non-inclusive phrases that should be avoided during a presentation. In another example, control phrases can be associated with trade secrets, company confidential information, or other information that should be avoided for one reason or another. In some embodiments, only one type of control phrase is tested. In other embodiments, more than one type of control phrase is tested. When multiple types of control phrases are tested, information stored for the summary and/or displayed in a prompt can comprise information regarding the type of control phrase that was found to exist. For example, in the case of a non-inclusive phrase, the user can be informed of the non-inclusive use. In the case of a trade secret phrase, the user can be informed of the trade-secret use. And so forth for other types of control phrases.

When multiple control phrases exist, the testing can be performed by a single detection/analysis engine or can be performed by multiple detection/analysis engines, each focused on a different type of control phrase.

While the flow diagram of FIG. 7 is designed to raise events when congruence is found between spoken phrases and control phrases. This is useful when the control phrases should not be spoken for one reason or another. However, with changes, the flow diagram can be used to flag instances when the control phrases are not used. This is useful when the control phrases should be used for one reason or another.

For example, it may be desirable to use particular phrases when describing something. The flow diagram of FIG. 7, with appropriate changes, can flag those instances when the phrases are not used (e.g., negative congruence criterion). In this situation, the matching test (operation 714) has its "Y" and "N" branches flipped so that the data is stored when a match is not found, rather than when a match is found. Additionally, or alternatively, it may be desirable to add additional logic and/or expand the loop (e.g., beginning at operation 704) to include more of the users spoken phrases before the system decides whether the control phrase has or has not been used. Such additional logic and/or expansion of the considered phrases can be associated with a segment of the script text.

As an example, suppose a user will present three slides on a particular product and it is desirable to use at least one of a set of phrases somewhere in the discussion of the three slides. The flow diagram can monitor the spoken phrases corresponding to the three slides. Once the system detects that a user has utilized a phrase in the discussion of the three slides, the condition can be considered to be met and the system can stop checking the remainder of the phrases for three slides. As an alternative, the system can continue checking and save information about the use of phrases whenever a match is detected so that it can be included as part of the summary.

On the other hand, if the system does not detect a match between the spoken phrases and the control phrases within the three slides, the condition can be considered to not be met and the system can store information about failure of the goal in the summary and/or display a prompt to the user. Additionally, or alternatively, the system can display a reminder (e.g., in a prompt) that the user should use one of the control phrases and then remove the reminder when the condition is met.

Any combination of the above can also be used in a single embodiment. Thus, in some embodiments, positive and negative congruence criterion can be used to detect when phrases are spoken and when they are not spoken. By selecting how the system responds to the positive and/or negative congruence, events of "phrase matched" and/or "phrase not matched" can be collected.

Also, when one or more phrases and/or one or more events are determined by the system, ranking and selection criterion such as that described in conjunction with 512 can be used to prioritize and/or select which phrases and/or events will be used for further processing in the system.

FIG. 8 illustrates an example flow diagram 800 illustrating prompt decision and composition according to some aspects of the present disclosure. The method begins at operation 802 and proceeds to operation 804 where the event type is accessed. For example, the event types that have been described in conjunction with the embodiments disclosed herein can be described as an "on script" event, an "off script" event, a "non-inclusive language" event, a "trade secret" event, a "proprietary information" event, a "misdescriptive phrase" event, a "descriptive phrase" event, an "emotion" event, a "gesture rate" event, a "gesture type" event, a "body language" event, and/or so forth.

One condition in deciding whether to display a prompt can be the event and/or type of event. Thus, in some embodiments, the flow diagram comprises correction type test 806, which ascertains whether the event is of a type that should be considered for a prompt. This is helpful, for example, when certain types of events will never be considered for prompt display. For example, perhaps in one embodiment the "body language" event will not result in display of a prompt under any circumstances. In that case, if the event is a "body language" event, the "N" branch is taken out of operation 806 and the method waits until the occurrence of the next event.

If the event is of a type that should be considered for a prompt, execution proceeds to operation 808 where a determination is made that, if a prompt is displayed, will it contain actionable information for the user. For example, some types of events indicate things that the user can immediately correct if they are informed of the situation. For example, if the event is "gesture rate" and the user can be informed that they are gesturing too much, the user can immediately act on that information and thus, the event can lead to actionable information for the user.

When actionable information will not result from any prompt, the "N" branch is taken out of operation 806 and the method waits until the occurrence of the next event. When the prompt can result in actionable information the "Y" branch is taken and execution proceed to operation 810.

Operation 810 identifies the prompt items that are to be displayed to the user and/or selects channels by which the prompts are to be displayed. Stated another way, operation 810 identifies what prompts should be displayed, the content of each prompt, and/or how the prompts and content should be presented to the user for the event that occurred. For example, if the event is "non-inclusive language" the prompts may comprise an alert prompt and an information prompt. The alert prompt is something to gain the user's attention and the information prompt informs the user of details about the event that occurred. The alert prompt may be sent via one channel and the information prompt by another. For example, the alert prompt may be a sound played through the user's headset while the information prompt is something displayed on a screen that the user can see.

Identifying prompt items and/or channels can be pre-determined or can be based on a set of rules or heuristics that are evaluated when the system selects which prompts to associate with the event, or a combination thereof. Additionally, or alternatively, identifying prompts and/or channels can be based on user settings, user profiles, the devices/systems the user is using or has access to, and/or so forth.

In embodiments that use pre-determined prompts, prompts associated with events in a pre-determined fashion. So that when event X occurs, prompt(s) Y are selected. In embodiments that use rules embodiments, prompts associated with an event are selected based on one or more of rules and context information. Furthermore, embodiments can combine rules and pre-determined aspects into a single embodiment. Thus, prompts may have default (pre-determined) aspects that are later modified by rules. Prompt channels associated with the prompts can also be pre-determined (e.g., information prompts are always sent to the user's display device), or can be selected based on rules (e.g., send to a user's display device if the audience cannot see what the user sees otherwise display the prompt on the user's mobile device). Furthermore, embodiments can combine rules and pre-determined aspects into a single embodiment. Thus, prompts may have default (pre-determined) channels that are later modified by rules. Any combination of these variations may be used in embodiments of the present disclosure. Thus, an embodiment may have pre-determined prompts but use rules to select prompt channels, or any other such combination.

Context information is any information that can be considered when deciding what prompts to select, the prompt content, and/or the channel that the prompt is delivered over. Prompt channels are discussed below. Context information includes, but is not limited to, one or more of user or device settings; user profile; devices available to the user; whether the presentation is live or a rehearsal; the venue and/or format of the presentation; the script; and/or so forth. The format of the presentation can comprise whether the user is standing in front of an audience, whether the user is presenting remotely through videoconference, whether the user is visible to the audience, whether the user has a device to view private information that the audience cannot see, and so forth.

The rules will evaluate the context information and determine what prompts should be sent. The rules can also modify an initial or default selection in some embodiments. For example, suppose in the case of a "repetition" event that flags when the user is simply repeating the content of the script, the default prompt is an alert prompt, designed to catch the user's attention and a content prompt that informs the user that they should focus on key points and not repeat the words on a slide. The context information shows that the user is presenting in person and has a screen where that the audience cannot see. The rules can combine the alert prompt and content prompt into a single prompt. As another example, the rules can keep the two prompts separate but select to send the alert prompt to a user's smartwatch and the alert to a screen that the audience cannot see.

Although the examples have discussed a single prompt of a single type (e.g., a single alert prompt coupled to a single information prompt), multiple prompts of a single type can also be identified and selected by operation 810.

Operation 812 evaluates whether the prompt(s) to be presented to a user is likely to distract them and allows the prompt to be sent if the likelihood of distraction within a designated threshold range (the "Y" option). Otherwise operation 812 prevents the prompt(s) from being sent (the "N" option). The principle is that even if an event was of a type that could generate a prompt and even if the prompt conveys actionable information, the prompt still may not be sent if the information conveyed is likely to provide a distraction for a user. During a presentation, a user is engaged in one activity (e.g., giving the presentation). The system should not overwhelm the user with information, which can cause the user to lose focus on the presentation. The goal of a prompt is to be helpful to a user and not to distract the user from their primary focus.

In keeping with this principle, operation 812 serves as a "distraction filter" that will prevent prompts from distracting the user. Thus, the tests for whether something has the likelihood to distract the user can be based one or more of

- The amount of information presented to the user. If the information is too much or too complicated to quickly absorb, the user may become distracted.
- The context of the presentation including any of the factors enumerated above as context information. Depending on the context, a prompt may be deemed too distracting to send or just fine to send. For example, when the user is rehearsing a presentation, the system may present more information or information of a different type than when the presentation is a "live" presentation in front of an audience.

The individual user. A model, such as a machine learning model, can be implemented and customized to the particular user.

User settings and/or user profile. The user can indicate things they would like to be prompted on and things they do not wish to be prompted on.

Other considerations.

Operation 812 can be implemented in different ways depending on the particular considerations of the embodiment. In a representative example, likelihood of distraction can be measured by how much information is presented to the user. Thus, the likelihood of distraction can be measured by correlating the amount of information, number of prompts, channels of the prompts, and so forth and comparing one or more of these to thresholds. However, because users are individuals and because the context of the presentations can impact how much the user can absorb quickly, the thresholds can be adjusted based on the user, the context, and/or any combination thereof.

In another representative example, a trained machine learning model such as the deep neural networks described above can be used. The inputs to the machine learning model can be the context, prompts, and/or prompt channels. The model can produce a likelihood of distraction, which can be compared to a threshold to determine whether prompts should be sent or not. The training on the machine learning model can be updated if the user provides feedback on whether the prompts were a distraction to the user. Additionally, or alternatively, one or more detection/analysis module can be used to detect if the user becomes distracted when the prompts are presented. This explicit or implicit feedback can be used with a machine learning algorithm to retrain the machine learning model by adjusting weights used by the model based on the feedback. Thus, the model can be continuously improved and increasingly customized to the user.

When operation 812 allows the prompt(s) to be distributed, operation 814 performs final composition and causes distribution and/or display of the prompts. Final composition can include things like tailoring the visual or other prompt aspects to the channel and/or device where the prompt will be sent.

The method ends at operation 816.

Figure 9:
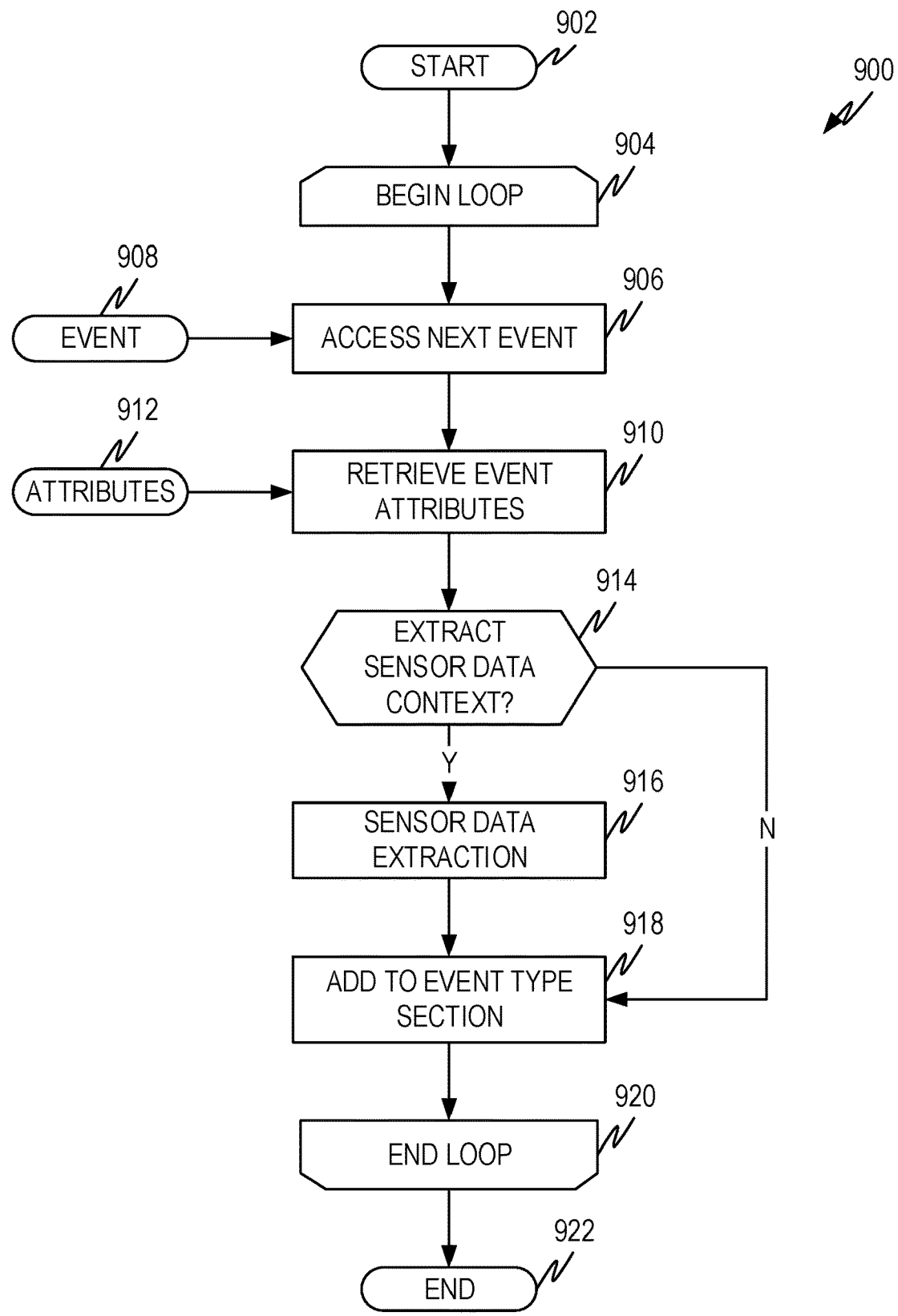
FIG. 9 illustrates an example flow diagram illustrating summary creation according to some aspects of the present disclosure.

FIG. 9 illustrates an example flow diagram 902 illustrating summary creation according to some aspects of the present disclosure. The summary can provide information that expands on events that resulted in a prompt to a user as well as information on events that did not result in a prompt to the user. For example, if a prompt was sent to the user that suggested that the user not simply read the content on the slide, the information in the summary can comprise additional information such as: which slides were displayed when the system detected the user repeating the information on the slide, how many slides the user repeated content on, what overall percentage of the presentation content was repeated by the user, what percentage of content on a slide was repeated, and so forth.

As another example, suppose the assistant service had a phrase detection engine which detects phrases that should not be said, phrases that should be said, or both. For phrases that should not be said, the summary can present which phrases were uttered that should not be, the number of times the phrase was uttered context for the utterances (which slide was displayed, what the user said before and/or after the uttered phrase, and so forth), and/or so forth.

Additionally, or alternatively, the summary can comprise a link to the data collected when the event was triggered. As an example, the system can link to audio data gathered when the assistant detected an utterance of a phrase. By clicking the link, the user can hear and/or see herself as she was speaking. The linked data can comprise a time period surrounding the event such as a first number of seconds before the event and a second number of seconds after the event, where the first number and the second number can be the same or different. Additionally, or alternatively, the linked data may be extracted using other techniques, such as referencing a transcription of the spoken data and semantically analyzing the text surrounding the event using any number of known semantic analysis techniques to extract the context of the event and then extracting the audio and/or vision data corresponding to the identified context. The event and text transcript can be aligned either by locating a spoken phrase in the transcript, by aligning the transcript to a time stamp associated with the event, or a combination thereof.

In the case of vision content, the same and/or similar extraction techniques can be utilized. For example, linked video data can comprise a time period surrounding the event such as a first number of seconds before the event and a second number of seconds after the event, where the first number and the second number can be the same or different. Additionally, or alternatively, a transcription of audio data can be made from the vision data and/or associated audio data. The transcript can be semantically analyzed to extract a context of the event and the extracting the corresponding audio and/or vision data. The event and text transcript can be aligned either by locating a spoken phrase in the transcript, by aligning the transcript to a time stamp associated with the event, or a combination thereof.

Linking to actual data collected during the presentation may help users understand how they sounded and/or looked when particular events occurred and to help them more fully understand the context of particular events in the summary.

The summary can also make suggestions regarding how the user can improve their presentation. For example, the system can suggest alternative phrases, different body language, gestures, and so forth. These can be presented in the summary itself, such as by a list of alternative phrasing the user can consider. Additionally, or alternatively, the system can present examples of other presentations that may be helpful for the user to listen to and/or see. For example, if the system detects the user's gestures can be improved, the system can offer a video clip of another presentation that has more effective use of gestures for the user to consider.

The flow diagram begins at operation 902 and proceeds to operation 904 which opens a loop over all the events that were tracked during the presentation.

Operation 906 accesses the next event 908 and operation 910 retrieves attributes 912 associated with the event. Attributes associated with the event can comprise any or all contextual data from the time of the event and/or that are related to the event. For example, attributes can include, but are not limited to, any or all of:

Event type;

Time stamp associated with the event (e.g., when did the event occur within the presentation);

Script information being displayed and/or presented at the time of the event such as an identifier associated with a displayed slide, the displayed slide, portion of the script corresponding to content being spoken by the user at the time of the event, and/or so forth;

Sensor data at the time of the event and/or surrounding the time of the event;

Transcript (e.g., converted sensor data) at the time of the event and/or surrounding the time of the event;

A confidence level calculated by the detection/analyses engine and associated with the event;

One or more metrics or additional data associated with the event such as number of words matched a phrase, alternative phrases that should have been used in place of the phrase used, and/or other data; and/or Other data.

Operation 914 identifies whether sensor data such as audio and/or vision data should be extracted from the sensor data stream and associated with the summary entry. This can be determined by user settings, by pre-determined aspects such as always extracting sensor data under certain conditions or never extracting sensor data under certain conditions, by a set of rules applied to the event and/or attributes, and/or by any combination thereof.

If the sensor data is to be extracted, the "Y" option is taken and operation 916 extracts the corresponding sensor data as described above.

As noted in conjunction with FIG. 4 a summary can contain various sections 414 where information related to common events and/or event types are presented. Operation 918 collects the information related to the event and adds it to the appropriate section. Additionally, or alternatively. Operation 918 can add to and/or gather statistics that are calculated across similar events and/or event types, such as percentages on how much of the script was repeated and/or not repeated by the user, how many control phrases were uttered and/or not uttered, overall gesture rate, number of appropriate/inappropriate gestures, and so forth.

Operation 920 ends the loop and initiates the loop for the next event, if any.

The method ends at operation 922.

Example Machine Architecture and Machine-Readable Medium

Figure 10:
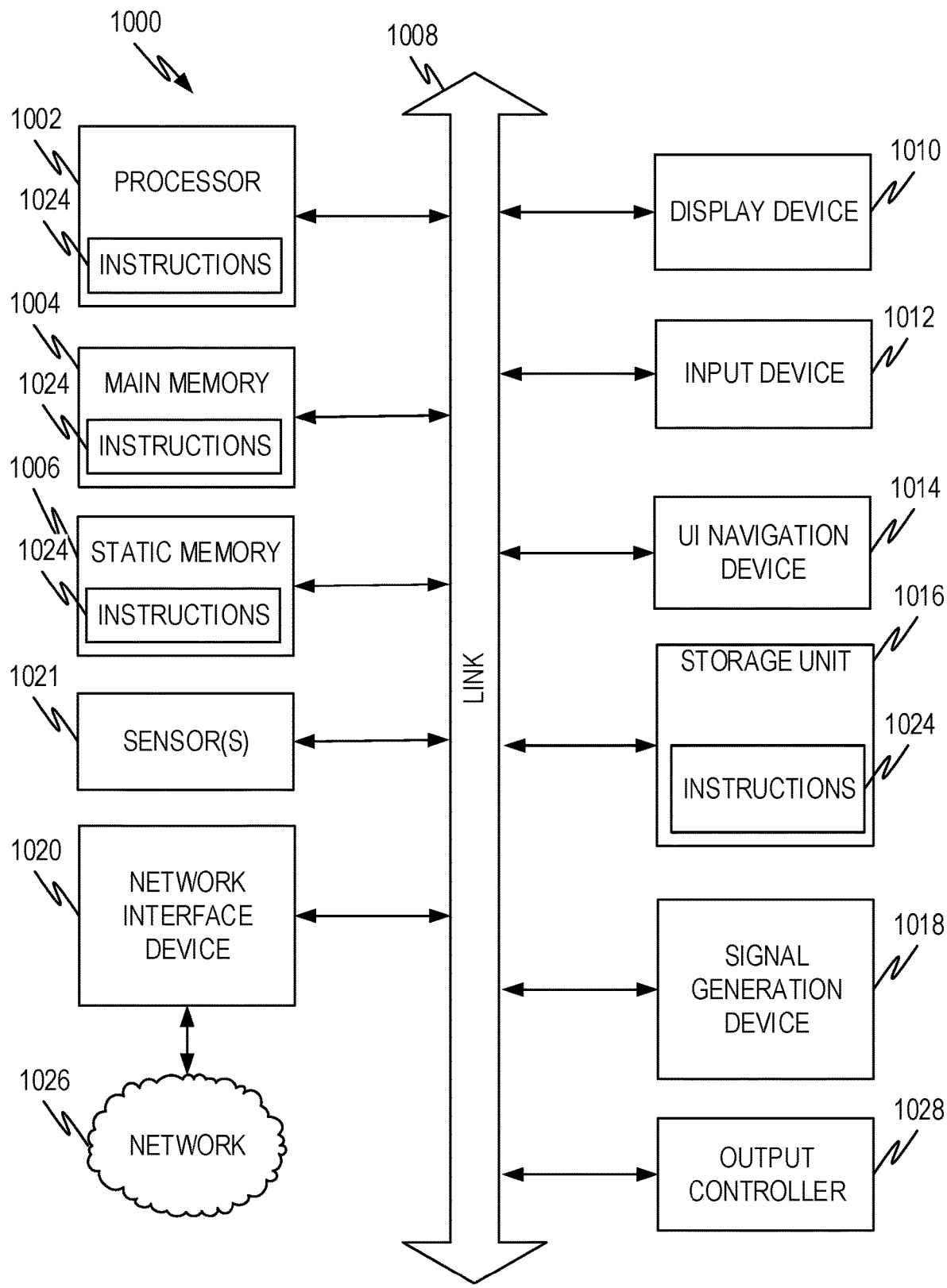
FIG. 10 illustrates a representative architecture for implementing the systems and other aspects disclosed herein or for executing the methods disclosed herein.

FIG. 10 illustrates a representative machine architecture suitable for implementing the systems and so forth or for executing the methods disclosed herein. The machine of FIG. 10 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 10 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), or combinations thereof), one or more memories such as a main memory 1004, a static memory 1006, or other types of memory, which communicate with each other via link 1008. Link 1008 may be a bus or other type of connection channel. The machine 1000 may include further optional aspects such as a graphics display unit 1010 comprising any type of display. The machine 1000 may also include other optional aspects such as an alphanumeric input device 1012 (e.g., a keyboard, touch screen, and so forth), a user interface (UI) navigation device 1014 (e.g., a mouse, trackball, touch device, and so forth), a storage unit 1016 (e.g., disk drive or other storage device(s)), a signal generation device 1018 (e.g., a speaker), sensor(s) 1021 (e.g., global positioning sensor, accelerometer(s), microphone(s), camera(s), and so forth), output controller 1028 (e.g., wired or wireless connection to connect and/or communicate with one or more other devices such as a universal serial bus (USB), near field communication (NFC), infrared (IR), serial/parallel bus, etc.), and a network interface device 1020 (e.g., wired and/or wireless) to connect to and/or communicate over one or more networks 1026.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1. A machine implemented method, comprising:
accessing input data comprising speech data collected by one or more sensors while a user is speaking, the data being in a format suitable for analysis;
receiving a script accompanying the user's speaking;
detecting a phrase within the input data;
determining whether congruence exists between the phrase and the script;
selecting a congruence criterion comprising at least one of either a positive congruence criterion that informs the user when congruence between the phrase and the script and a negative congruence criterion that informs the user when congruence between the phrase and the script does not exist;
responsive to the congruence criterion being met;
storing an indication of the congruence criterion being met; and
determining whether a real-time prompt should be displayed to the user and responsive to determining that a real-time prompt should be displayed to the user, causing display of the real-time prompt.

Example 2. The method of example 1 wherein the script comprises a slide of a presentation, or a text of a document, or both.

Example 3. The method of example 1 or 2 wherein the script comprises a slide of a presentation and wherein the congruence criteria is the positive congruence criterion.

Example 4. The method of example 1, 2, or 3 wherein the script comprises a collection of phrases that should not be spoken and wherein the congruence criteria is the positive congruence criterion.

Example 5. The method of example 4 wherein the collection of phrases comprises non-inclusive phrases.

Example 6. The method of example 4 wherein the collection of phrases are related to company proprietary information.

Example 7. The method of example 1, 2, 3, 4, 5, or 6 wherein determining whether congruence exists between the phrase and the script comprises:
comparing the phrase to the script;
calculating a Levenshtein edit distance between the phrase and at least a portion of the script;
responsive to the edit distance falling within a threshold range, determining that congruence exists between the phrase and the script.

Example 8. The method of example 1, 2, 3, 4, 5, or 6 wherein determining whether congruence exists between the phrase and the script comprises using a machine learning model trained to identify phrases within the script.

Example 9. The method of example 1, 2, 7, or 8 wherein the script comprises text that should be spoken and wherein the congruence criterion is the negative congruence criterion.

Example 10. The method of example 1, 2, 3, 4, 5, 6, 7, 8, or 9 further comprising receiving vision data and wherein the method further comprises:
detecting at least one of a facial expression of the user, an emotion of the user, and a gesture of the user;
responsive to detecting at least one of a facial expression, an emotion, and the gesture, determining whether the at least one of a facial expression, an emotion, and the gesture is appropriate to a user context;
responsive to determining that the at least one of a facial expression, an emotion, and the gesture is not appropriate to the user context;
storing an indication of the at least one of a facial expression, an emotion, and the gesture; and
determining whether a real-time prompt should be displayed to the user and responsive to determining that a real-time prompt should be displayed to the user, causing display of the real-time prompt.

Example 11. The method of example 1, 2, 7, 8, 9, or 10 wherein the script comprises asset of phrases that should be spoken by the user and wherein the congruence criterion comprises the negative congruence criterion.

Example 12. The method of example 1, 2, 3, 4, 5, 6, 7, 8, 9, 10, or 11 wherein determining whether a real-time prompt should be displayed is based on one or more of:
an amount of information to be displayed in the real-time prompt;
a type of correction to be displayed in the real-time prompt; and
a determination that information to be displayed in the real-time prompt is actionably by the user while the user is speaking.

Example 13. The method of example 1, 2, 3, 4, 5, 6, 7, 8, 9, 10, 11, or 12 wherein the indication of the congruence criterion being met comprises one or more of:
a type of congruence criterion;
a phrase spoken by the user;
a subset of the script; and
a statistical metric indicating a percentage of congruence.

Example 14. An apparatus comprising means to perform a method as in any preceding example.

Example 15. Machine-readable storage including machine-readable instructions, when executed, to implement a method or realize an apparatus as in any preceding example.

Example 16. A machine implemented method, comprising:
accessing input data comprising speech data collected by one or more sensors while a user is speaking, the data being in a format suitable for analysis;
receiving a script accompanying the user's speaking;
detecting a phrase within the input data;
determining whether congruence exists between the phrase and the script;
selecting a congruence criterion comprising at least one of either a positive congruence criterion that informs the user when congruence between the phrase and the script and a negative congruence criterion that informs the user when congruence between the phrase and the script does not exist;
responsive to the congruence criterion being met;
storing an indication of the congruence criterion being met; and
determining whether a real-time prompt should be displayed to the user and responsive to determining that a real-time prompt should be displayed to the user, causing display of the real-time prompt.

Example 17. The method of example 16 wherein the script comprises a slide of a presentation, or a text of a document, or both.

Example 18. The method of example 16 wherein the script comprises a slide of a presentation and wherein the congruence criteria is the positive congruence criterion.

Example 19. The method of example 16 wherein the script comprises a collection of phrases that should not be spoken and wherein the congruence criteria is the positive congruence criterion.

Example 20. The method of example 19 wherein the collection of phrases comprises non-inclusive phrases.

Example 21. The method of example 19 wherein the collection of phrases is related to company proprietary information.

Example 22. The method of example 16 wherein determining whether congruence exists between the phrase and the script comprises:
  comparing the phrase to the script;
  calculating a Levenshtein edit distance between the phrase and at least a portion of the script;
  responsive to the edit distance falling within a threshold range, determining that congruence exists between the phrase and the script.

Example 23. The method of example 16 wherein determining whether congruence exists between the phrase and the script comprises using a machine learning model trained to identify phrases within the script.

Example 24. The method of example 16 wherein the script comprises text that should be spoken and wherein the congruence criterion is the negative congruence criterion.

Example 25. The method of example 16 further comprising receiving vision data and wherein the method further comprises:
  detecting at least one of a facial expression of the user, an emotion of the user, and a gesture of the user;
  responsive to detecting at least one of a facial expression, an emotion, and the gesture, determining whether the at least one of a facial expression, an emotion, and the gesture is appropriate to a user context;
  responsive to determining that the at least one of a facial expression, an emotion, and the gesture is not appropriate to the user context;
  storing an indication of the at least one of a facial expression, an emotion, and the gesture; and
  determining whether a real-time prompt should be displayed to the user and responsive to determining that a real-time prompt should be displayed to the user, causing display of the real-time prompt.

Example 26. A system comprising a processor and computer executable instructions, that when executed by the processor, cause the system to perform operations comprising:
  accessing input data comprising speech data or vision data or both collected by one or more sensors while a user is speaking, the data being in a format suitable for analysis;
  receiving a script accompanying the user's speaking;
  responsive to the collected data comprising speech data;
  detecting a phrase within the input data;
  determining whether congruence exists between the phrase and the script;
  selecting a congruence criterion comprising at least one of either a positive congruence criterion that informs the user when congruence between the phrase and the script and a negative congruence criterion that informs the user when congruence between the phrase and the script does not exist;
  responsive to the congruence criterion being met;
  storing an indication of the congruence criterion being met; and
  determining whether a real-time prompt should be displayed to the user and responsive to determining that a real-time prompt should be displayed to the user, causing display of the real-time prompt; and
  responsive to the collected data comprising vision data;
  detecting a gesture of the user using a trained machine learning model;
  responsive to detecting, determining whether the gesture is appropriate to the script;
  responsive to determining that the gesture is not appropriate to the script;
  storing an indication of the gesture; and
  determining whether a real-time prompt should be displayed to the user and responsive to determining that a real-time prompt should be displayed to the user, causing display of the real-time prompt.

Example 27. The system of example 26 wherein the script comprises a set of phrases that should not be spoken by the user and wherein the congruence criterion comprises the positive congruence criterion.

Example 28. The system of example 27 wherein the set of phrases comprises a set of non-inclusive phrases.

Example 29. The system of example 26 wherein the script comprises a set of phrases that should be spoken by the user and wherein the congruence criterion comprises the negative congruence criterion.

Example 30. The system of example 26 wherein determining whether a real-time prompt should be displayed is based on one or more of:
  an amount of information to be displayed in the real-time prompt;
  a type of correction to be displayed in the real-time prompt; and
  a determination that information to be displayed in the real-time prompt is actionably by the user while the user is speaking.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A machine implemented method performed by a computer-implemented digital assistant that is configured to provide real-time feedback regarding a presentation being given by a user, the method comprising:
  accessing input data comprising speech data collected by one or more sensors while the user is speaking and additionally while a client computing device of the user is displaying a slide of a slideshow presentation on a display associated with the client computing device, wherein the slideshow presentation is displayed by way of a slideshow application installed on the client computing device;
  receiving text on the slide that accompanies the user's speaking;
  detecting a phrase spoken by the user within the input data;
  computing a distance between the text on the slide and the phrase; and
  responsive to determining that the distance between the text on the slide and the phrase is beneath a predefined threshold, causing a real-time prompt to be presented while the slide of the slideshow presentation continues to be displayed on the display, the real-time prompt instructing the user to deviate from the text on the slide when setting forth speech that accompanies the slide.

2. The method of claim 1, the method further comprising:
detecting a second phrase spoken by the user in the input data, wherein the second phrase is included in the user's speaking;
determining that the second phrase refers to a trade secret; and
causing a second real-time prompt to be presented on the display, wherein the second real-time prompt instructs the user to refrain from discussing the trade secret while giving the presentation.

3. The method of claim 1, the method further comprising:
detecting a second phrase spoken by the user in the input data;
determining that the second phrase is potentially offensive to one or more people in an audience for the presentation; and
causing a second real-time prompt to be presented on the display, wherein the second real-time prompt instructs the user to refrain from uttering the second phrase while giving the presentation.

4. The method of claim 1, the method further comprising:
detecting, based upon the input data, an emotion exhibited by the user while the user is uttering a second phrase;
determining that the emotion exhibited by the user is inconsistent with the second phrase; and
causing a second real-time prompt to be presented on the display, wherein the second real-time prompt instructs the user to alter at least one of a facial expression or a tone of speech while uttering the second phrase while giving the presentation.

5. The method of claim 1, the method further comprising:
detecting, based upon the input data, a gesture performed by the user while the user is uttering a second phrase;
determining that the gesture is inconsistent with the second phrase; and
causing a second real-time prompt to be presented on the display, wherein the second real-time prompt instructs the user to refrain from making the gesture while uttering the second phrase while giving the presentation.

6. The method of claim 1 wherein the distance is a Levenshtein edit distance.

7. The method of claim 1, further comprising:
detecting at least one of:
a facial expression of the user while the user is speaking; or
a gesture set forth by the user while the user is speaking; and
generating a summary document for the presentation, wherein the summary document includes improvements that the user can make when giving the presentation, and further wherein the improvements are identified based upon the at least one of the facial expression of the user or the gesture set forth by the user.

8. A computing system comprising:
a processor; and
memory storing instructions that, when executed by the processor, cause the processor to perform acts comprising:
accessing input data comprising speech data collected by one or more sensors while a user is speaking and additionally while a client computing device of the user is displaying a slide of a slideshow presentation on a display associated with the client computing device, wherein the slideshow presentation is displayed by way of a slideshow application installed on the client computing device;
receiving text on the slide that accompanies the user's speaking;
detecting a phrase spoken by the user within the input data;
computing a distance between the text on the slide and the phrase; and
responsive to determining that the distance between the text on the slide and the phrase is beneath a predefined threshold, causing a real-time prompt to be presented while the slide of the slideshow presentation continues to be displayed on the display, the real-time prompt instructing the user to deviate from the text on the slide when setting forth speech that accompanies the slide.

9. The computing system of claim 8, the acts further comprising:
detecting a second phrase spoken by the user in the input data, wherein the second phrase is included in the user's speaking;
determining that the second phrase refers to a trade secret; and
causing a second real-time prompt to be presented on the display, wherein the second real-time prompt instructs the user to refrain from discussing the trade secret while giving the presentation.

10. The computing system of claim 8, the acts further comprising:
detecting a second phrase spoken by the user in the input data;
determining that the second phrase is potentially offensive to one or more people in an audience for the presentation; and
causing a second real-time prompt to be presented on the display, wherein the second real-time prompt instructs the user to refrain from uttering the second phrase while giving the presentation.

11. The computing system of claim 8, the acts further comprising:
detecting, based upon the input data, an emotion exhibited by the user while the user is uttering a second phrase;
determining that the emotion exhibited by the user is inconsistent with the second phrase; and
causing a second real-time prompt to be presented on the display, wherein the second real-time prompt instructs the user to alter at least one of a facial expression or a tone of speech while uttering the second phrase while giving the presentation.

12. The computing system of claim 8, the acts further comprising:
detecting, based upon the input data, a gesture performed by the user while the user is uttering a second phrase;
determining that the gesture is inconsistent with the second phrase; and
causing a second real-time prompt to be presented on the display, wherein the second real-time prompt instructs the user to refrain from making the gesture while uttering the second phrase while giving the presentation.

13. The computing system of claim 8, wherein the distance is a Levenshtein edit distance.

14. The computing system of claim 8, the acts further comprising generating a summary document corresponding to the slideshow presentation, wherein the summary document describes an improvement that the user can make when presenting the slideshow presentation, and further wherein the improvement pertains to the user deviating from text in slides of the slideshow presentation when presenting the slideshow presentation.

15. A non-transitory computer-readable medium comprising instructions that, when executed by a processor, cause the processor to perform acts comprising:

accessing input data comprising speech data collected by one or more sensors while a user is speaking and additionally while a client computing device of the user is displaying a slide of a slideshow presentation on a display associated with the client computing device, wherein the slideshow presentation is displayed by way of a slideshow application installed on the client computing device;

receiving text on the slide that accompanies the user's speaking;

detecting a phrase spoken by the user within the input data;

computing a distance between the text on the slide and the phrase; and responsive to determining that the distance between the text on the slide and the phrase is beneath a predefined threshold, causing a real-time prompt to be presented while the slide of the slideshow presentation continues to be displayed on the display, the real-time prompt instructing the user to deviate from the text on the slide when setting forth speech that accompanies the slide.

16. The non-transitory computer-readable medium of claim 15, the acts further comprising:

detecting a second phrase spoken by the user in the input data, wherein the second phrase is included in the user's speaking;

determining that the second phrase refers to a trade secret; and causing a second real-time prompt to be presented on the display, wherein the second real-time prompt instructs the user to refrain from discussing the trade secret while giving the presentation.

17. The non-transitory computer-readable medium of claim 15, the acts further comprising:

detecting a second phrase spoken by the user in the input data;

determining that the second phrase is potentially offensive to one or more people in an audience for the presentation; and causing a second real-time prompt to be presented on the display, wherein the second real-time prompt instructs the user to refrain from uttering the second phrase while giving the presentation.

18. The non-transitory computer-readable medium of claim 15, the acts further comprising:

detecting, based upon the input data, an emotion exhibited by the user while the user is uttering a second phrase;

determining that the emotion exhibited by the user is inconsistent with the second phrase; and causing a second real-time prompt to be presented on the display, wherein the second real-time prompt instructs the user to alter at least one of a facial expression or a tone of speech while uttering the second phrase while giving the presentation.

19. The non-transitory computer-readable medium of claim 15, the acts further comprising:

detecting, based upon the input data, a gesture performed by the user while the user is uttering a second phrase;

determining that the gesture is inconsistent with the second phrase; and causing a second real-time prompt to be presented on the display, wherein the second real-time prompt instructs the user to refrain from making the gesture while uttering the second phrase while giving the presentation.

20. The non-transitory computer-readable medium of claim 15, wherein the input data comprises video data, the acts further comprising:

causing a second real-time prompt to be presented on the display, wherein the second real-time prompt indicates that the user is inappropriately using his or her hands while speaking.

* * * * *